(12) United States Patent
Foegeding et al.

(10) Patent No.: US 8,227,009 B2
(45) Date of Patent: Jul. 24, 2012

(54) PROCESS FOR MAKING WHEY PROTEINS HAVING IMPROVED THERMAL STABILITY IN BEVERAGE APPLICATIONS AT NEUTRAL PH

(75) Inventors: E. Allen Foegeding, Raleigh, NC (US); Bongkosh Vardhanabhuti, Nonthaburi (TH); Paige Luck, Cary, NC (US)

(73) Assignee: North Carolina State University, Raleigh, NC (US)

( * ) Notice: Subject to any disclaimer, the term of this patent is extended or adjusted under 35 U.S.C. 154(b) by 979 days.

(21) Appl. No.: 12/212,995

(22) Filed: Sep. 18, 2008

(65) Prior Publication Data

US 2009/0074918 A1 Mar. 19, 2009

Related U.S. Application Data

(60) Provisional application No. 60/973,637, filed on Sep. 19, 2007.

(51) Int. Cl.
*A23L 1/304* (2006.01)
*A23L 2/66* (2006.01)

(52) U.S. Cl. .............. 426/583; 426/72; 426/73; 426/74; 426/520; 426/521; 426/577

(58) Field of Classification Search .................... 426/72, 426/73, 74, 590, 583, 520, 521, 577
See application file for complete search history.

(56) References Cited

U.S. PATENT DOCUMENTS 4,804,552 A * 2/1989 Ahmed et al. ................ 426/580
(Continued)

FOREIGN PATENT DOCUMENTS

EP 1 269 854 A1 1/2003
(Continued)

OTHER PUBLICATIONS

Ju et al. "Gelation of pH-Aggregated Whey Protein Isolate Solution . . . ", J. of Agricultural and Food Chemistry, ACS Publications, 1998, vol. 46(55)pp. 1830-1835, enclosed pages are 1-8.*

(Continued)

*Primary Examiner* — Helen F Heggestad
(74) *Attorney, Agent, or Firm* — Myers Bigel Sibley & Sajovec, PA (57) ABSTRACT

The present invention is directed to a method for producing a thermal stable whey protein beverage comprising: (a) providing an aqueous solution of at least 2% (w/w) whey proteins and having a neutral pH; then (b) heating the aqueous solution of whey proteins; then (c) cooling the aqueous solution of whey proteins; then (d) adding at least one mineral salt at a neutral pH; and then (e) heating the aqueous solution of whey protein to produce a thermal stable whey protein beverage. The present invention is further directed to a method for producing a thermal stable whey protein beverage under aseptic processing conditions or pasteurization or ultrapasteurization conditions comprising: (a) providing an aqueous solution of at least 2% whey proteins and having a neutral pH; then (b) heating the aqueous solution of whey proteins; then (c) cooling the aqueous solution of whey proteins; then (d) adding at least one mineral salt to produce a thermal stable whey protein beverage. The present invention is also directed to a method for producing a thermal stable whey protein beverage comprising adding at least one anionic polysaccharide. Additionally, the present invention provides thermal stable whey protein beverages made by the methods provided herein.

24 Claims, 1 Drawing Sheet

U.S. PATENT DOCUMENTS

| | | | |
|---|---|---|---|
| 6,139,900 | A | 10/2000 | Foegeding et al. |
| 6,261,624 | B1 | 7/2001 | Hudson et al. |
| 6,383,551 | B1 | 5/2002 | Foegeding et al. |
| 6,451,371 | B1 | 9/2002 | Foegeding et al. |
| 6,811,800 | B2 | 11/2004 | Luhadiya et al. |
| 7,205,018 | B2 | 4/2007 | Sherwood et al. |
| 2003/0091722 | A1 | 5/2003 | Foegeding et al. |
| 2003/0099753 | A1* | 5/2003 | Yang .................. 426/599 |
| 2004/0156969 | A1 | 8/2004 | Paulsen et al. |
| 2005/0153021 | A1 | 7/2005 | Bouman et al. |
| 2005/0163887 | A1 | 7/2005 | Anand et al. |
| 2006/0003073 | A1 | 1/2006 | Etzel et al. |
| 2007/0082118 | A1 | 4/2007 | Fletcher |
| 2007/0148307 | A1* | 6/2007 | Sherwood et al. ............. 426/590 |

FOREIGN PATENT DOCUMENTS

| | | |
|---|---|---|
| JP | 2000-032910 | 2/2000 |
| JP | 2000-312572 | 11/2000 |
| JP | 2001-046031 | 2/2001 |
| WO | WO 2006/058083 A2 | 6/2006 |
| WO | WO 2006/119064 A2 | 11/2006 |

OTHER PUBLICATIONS

De La Fuente et al. "Recent Advances in the Characterisation of Heat-Induced Aggregates and Intermediates of Whey Proteins" *Trends in Food Science and Technology* 13:262-274 (2002).

International Search Report and Written Opinion of International Application No. PCT/US2008/010869, mailed Jan. 5, 2009 (17 pages).

Keowmaneechai and McClements. "Influence of EDTA and Citrate on Thermal Stability of Whey Protein Stabilized Oil-in-Water Emulsions Containing Calcium Chloride" *Food Research International* 39:230-239 (2006).

Mleko and Foegeding. "Formation of Whey Protein Polymers: Effects of a Two-Step Heating Process on Rheological Properties" *Journal of Texture Studies* 30:137-149 (1999).

Yazici et al. "Formulation and Processing of a Heat Stable Calcium-Fortified Soy Milk" *Journal of Food Science* 62(3):535-538 (1997).

Rittmanic. "U.S. Whey Proteins in Ready-to-Drink Beverages" Applications Monograph Beverages, U.S. Dairy Export Council, pp. e3.7.1-e3.7.8 (2006).

* cited by examiner

PROCESS FOR MAKING WHEY PROTEINS HAVING IMPROVED THERMAL STABILITY IN BEVERAGE APPLICATIONS AT NEUTRAL PH

STATEMENT OF PRIORITY

This application claims the benefit, under 35 U.S.C. §119 (e), of U.S. Provisional Application No. 60/973,637, filed Sep. 19, 2007, the entire contents of which are incorporated by reference herein.

FIELD OF THE INVENTION

The present invention relates to methods for producing whey proteins with improved thermal stability in liquids, including beverages that include mineral salts at a neutral pH, and beverages thereof.

BACKGROUND OF THE INVENTION

Wellness/functional beverages are becoming the fastest growing beverage segment in the U.S. (Miller, G., *Healthy growth ahead for wellness drinks*, Food Technology 10: 21-24 (2005)). In particular, the sports/energy drink category was reported to have grown 10% in 2003/2004 and was one of the fastest growing food and beverage categories worldwide (Nielson, A. C., *What's hot around the globe: Insights on growth in food and beverages* 2004, ACNielson Global Services: 1-39 (2004)). In general, high protein sports drinks make up a considerable portion of this growing drink market with whey proteins being the major protein ingredient in these drinks. Much has been learned lately about the role of proteins in improving health. By reducing consumption of carbohydrates and increasing consumption of protein, individuals might benefit by losing weight, controlling diabetes, losing fat and building muscle.

Whey proteins have a high nutritive value, due in part at least to the compositional profile of the proteins that includes a balanced array of amino acids. As a result, whey proteins are recognized as a premier protein source, particularly for individuals who are health-conscious and have specific dietary needs, such as athletes and body builders. Generally, it is desirable to provide as much protein as possible from whey proteins. However, as the whey protein content is increased and mineral salts are added, nutritional liquid compositions or beverages, such as sports nutrition beverages, suffer from problems.

For instance, the optical clarity of whey protein containing beverages can be maintained at pH ≦3.5 and low levels of salts (generally lower than 30 mM), but even under these conditions, once the protein concentration increases to between 3 and 5%, a significant level of astringency is detected. Neutral pH drinks do not have the astringency problem but whey proteins form large aggregates that may phase separate or gel. This is prevented by using mixtures of whey or other milk proteins; however, the drinks are opaque.

Properties that can be considered detrimental to the quality of protein beverages include loss of clarity (increased turbidity or opacity or the presence of an undesirable pigment), elevated viscosity, phase separation, elevated level of astringency and undesirable flavor and/or aroma. The majority of these defects involve heat-induced changes in the proteins. Thus, the high temperatures used for pasteurization and ultra high temperature sterilization in conventional beverage processing can be problematic. In conventional beverage processing, the raw materials are prepared and mixed before they are heated and cooled. Whey proteins become cloudy and/or precipitate when subjected to these elevated temperatures. In addition, whey proteins at neutral pH and in the presence of mineral salts, such as calcium, will aggregate after being heated which results in a turbid appearance and/or gelation thus limiting the potential market of high protein drinks with calcium supplement.

Thermal stability of proteins is a general term that describes the ability of a protein solution to survive a thermal process without detrimental changes. There has been considerable interest in the development of high protein drinks containing mineral salts at neutral pH, which remain stable after heat processing. Success in developing such whey protein products or processes will certainly benefit the dairy and beverage industries.

Accordingly, the present invention discloses a process of making thermally stable whey proteins for high protein beverages containing mineral salts at a neutral pH, which can be used not only in making high-protein beverages containing mineral salts at a neutral pH, but also in other liquid and semi-solid applications which require heat stable whey proteins, such as soups, sauces, gravies and syrups.

SUMMARY OF THE INVENTION

The present invention is directed to methods of making a thermal stable beverage containing mineral salts at a neutral pH wherein the beverage remains stable after heating, and the beverage, therefrom.

Accordingly, a first aspect of the invention is a method for producing a thermal stable whey protein beverage comprising: (a) providing an aqueous solution of at least 2% whey proteins and having a neutral pH; then (b) heating said aqueous solution of whey proteins; then (c) cooling said aqueous solution of whey proteins; then (d) adding at least one mineral salt; and then (e) heating said aqueous solution of whey protein to produce a thermal stable whey protein beverage.

A second aspect of the invention is a method for producing a thermal stable whey protein beverage under aseptic processing conditions, or pasteurizing or ultrapasteurizing conditions comprising: (a) providing an aqueous solution of at least 2% whey proteins and having a neutral pH; then (b) heating said aqueous solution of whey proteins; then (c) cooling said aqueous solution of whey proteins; and then (d) adding at least one mineral salt to produce a thermal stable whey protein beverage.

A third aspect of the invention is a method for producing a thermal stable whey protein beverage further comprising adding at least one anionic polysaccharide prior to or during the first heating step (e.g., step (a) or step (e)).

A fourth aspect of the present invention is a thermal stable whey protein beverage comprising: a whey protein concentration of at least 2% at a neutral pH; at least one mineral salt at a concentration of up to 60 mM; a viscosity of from 3 mPa s to 10 mPa s when measured at 50 1/s; and an optical density of 0.050 to 0.400 when measured at 600 nm.

BRIEF DESCRIPTION OF THE FIGURES

FIG. 2A. A 5% β-lactoglobulin solution with sodium chloride heated in a conventional one-step heating process; FIG. 2B. A 5% β-lactoglobulin solution with sodium chloride processed as described in the present invention.

FIG. 3A. A 3% β-lactoglobulin solution with 40 mM sodium chloride at pH 6.2 is heated for 15 min at 85° C.; FIG. 3B. A 3% β-lactoglobulin solution with polysaccharide and 40 mM sodium chloride at pH 6.2 is heated for 15 min at 85° C.; FIG. 3C. A 6% β-lactoglobulin solution at pH 7.0 is heated for 10 min at 85° C.; the solution is then cooled and diluted with water to 3% and 40 mM sodium chloride is added, pH 6.2, and the solution is then heated again for 15 min at 85° C.; FIG. 3D. A 6% β-lactoglobulin solution with an anionic polysaccharide at pH 6.2 is heated to 85° C. for 10 min. The β-lactoglobulin solution is then cooled and diluted with water to 3% and 40 mM sodium chloride is added and the solution is then heated again at 85° C. for 15 min.

DETAILED DESCRIPTION

The present invention will now be described more fully hereinafter with reference to the accompanying drawings and specification, in which preferred embodiments of the invention are shown. This invention may, however, be embodied in different forms and should not be construed as limited to the embodiments set forth herein.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

As used herein, "a," "an" or "the" can mean one or more than one. For example, "a" cell can mean a single cell or a multiplicity of cells.

Also as used herein, "and/or" refers to and encompasses any and all possible combinations of one or more of the associated listed items, as well as the lack of combinations when interpreted in the alternative ("or").

The term "about," as used herein when referring to a measurable value such as an amount of dose (e.g., an amount of a non-viral vector) and the like, is meant to encompass variations of ±20%, ±10%, ±5%, ±1%, +0.5%, or even ±0.1% of the specified amount.

As used herein, the transitional phrase "consisting essentially of" means that the scope of a claim is to be interpreted to encompass the specified materials or steps recited in the claim, "and those that do not materially affect the basic and novel characteristic(s)" of the claimed invention. See, *In re Herz,* 537 F.2d 549, 551-52, 190 U.S.P.Q. 461, 463 (CCPA 1976) (emphasis in the original); see also MPEP §2111.03. Thus, the term "consisting essentially of" when used in a claim of this invention is not intended to be interpreted to be equivalent to "comprising."

All publications, patent applications, patents and other references cited herein are incorporated by reference in their entireties for the teachings relevant to the sentence and/or paragraph in which the reference is presented.

DEFINITIONS

"Thermal stability" or "thermal stable" as used herein refers to a beverage that is stable after heating and storage for about 3 weeks to 12 months at a temperature of about 4° C. to about 40° C. (depending on the heating process). The turbidity of the beverage does not increase more than 0.2 absorbance units when measuring the optical density at 400 nm to 600 nm.

As used herein "aseptic processing conditions" refers to a method in which food is sterilized or commercially sterilized outside the container, usually in a continuous process, and then placed in previously sterilized containers, and subsequently sealed under conditions free of microorganisms.

"Pasteurization" or "pasteurizing" as used herein refers to a mild heat treatment process for fluid foods to specifically kill pathogenic microorganisms during their vegetative state. The product shelf life is about 2 to 3 weeks under refrigerated conditions (less than 45° F.).

As used herein "ultrapasteurization" or "ultra pasteurizing" refers to pasteurization at high temperatures (138° C. [280° F.] or above for 2 sec or longer) with the objective being similar to pasteurization and a further extended shelf life of the product to about 6 to 8 weeks under refrigeration.

"Viscosity" as used herein refers to the internal resistance to flow offered by a gas or liquid when subjected to shear stress.

A first aspect of the present invention is a method for producing a thermal stable whey protein beverage comprising: (a) providing an aqueous solution of at least about 2% whey proteins and having a neutral pH; then (b) heating said aqueous solution of whey proteins; then (c) cooling said aqueous solution of whey proteins; then (d) adding at least one mineral salt; and then (e) heating said aqueous solution of whey protein to produce a thermal stable whey protein beverage.

A further aspect of the present invention is a method for producing a thermal stable whey protein beverage under aseptic processing conditions, or pasteurizing or ultrapasteurizing conditions comprising: (a) providing an aqueous solution of at least about 2% whey proteins and having a neutral pH; then (b) heating said aqueous solution of whey proteins; then (c) cooling said aqueous solution of whey proteins; and then (d) adding at least one mineral salt to produce a thermal stable whey protein beverage.

A still further aspect of the invention is a method for producing a thermal stable whey protein beverage comprising: (a) providing an aqueous solution of at least 2% whey proteins and having a neutral pH, adding at least one anionic polysaccharide; then (b) heating said aqueous solution of whey proteins; then (c) cooling said aqueous solution of whey proteins; then (d) adding at least one mineral salt; and then (e) heating said aqueous solution of whey protein to produce a thermal stable whey protein beverage. In further embodiments, the at least one anionic polysaccharide of the present invention can be added at step (b).

An additional aspect of the invention is a method for producing a thermal stable whey protein beverage under aseptic processing conditions, or pasteurizing or ultrapasteurizing conditions comprising: (a) providing an aqueous solution of at least 2% whey proteins and having a neutral pH, adding at least one anionic polysaccharide; then (b) heating said aqueous solution of whey proteins; then (c) cooling said aqueous solution of whey proteins; and then (d) adding at least one mineral salt to produce a thermal stable whey protein beverage. In further embodiments, the at least one anionic polysaccharide of the present invention can be added at step (b).

In some aspects of the invention, the neutral pH of the aqueous solution of whey proteins can be adjusted at step (d) to be the same neutral pH or a higher or lower neutral pH than that provided at step (a). Thus, in some aspects, the method of the present invention further comprises adjusting the pH at step (d) to a neutral pH.

Accordingly, in some aspects of the invention, a method is provided for producing a thermal stable whey protein beverage comprises providing an aqueous solution of at least 2% whey protein. In other aspects of the method of the invention, the method comprises providing an aqueous solution having a neutral pH. In still other aspects of the invention, the aqueous solution of whey proteins is heated. In yet other aspects of the invention, the aqueous solution of whey proteins is cooled. In additional aspects of the method of the present invention, at least one mineral salt is added. In other aspects of the invention, the aqueous solution of whey proteins is heated a second time. In some aspects of the method of the present invention, the method is carried out under aseptic processing conditions, or pasteurizing or ultrapasteurizing conditions. In other aspects of the invention, an anionic polysaccharide is added. In still further aspects of the invention, the neutral pH of the aqueous solution of whey proteins can be adjusted to be the same or a different neutral pH than that of the starting neutral pH.

The aqueous solution of whey proteins in step (a) can be provided at a concentration in a range of 2% weight percent (w/w) to 10% weight percent (w/w). Thus, the aqueous solution of whey proteins in step (a) can be provided at a concentration in weight percent of 2%, 3%, 4%, 5%, 6%, 7%, 8%, 9%, or 10%, and the like. In other embodiments, the aqueous solution of whey proteins in step (a) can be provided at a concentration in weight percent in a range from 2% to 4%, from 2% to 5%, from 2% to 6%, from 2% to 7%, from 2% to 8%, from 2% to 9%, from 3% to 4%, from 3% to 5%, from 3% to 6%, from 3% to 7%, from 3% to 8%, from 3% to 9%, from 3% to 10%, from 4% to 5%, from 4% to 6%, from 4% to 7%, from 4% to 8%, from 4% to 9%, from 4% to 10%, from 5% to 6%, from 5% to 7%, from 5% to 8%, from 5% to 9%, from 5% to 10%, from 6% to 7%, from 6% to 8%, from 6% to 9%, from 6% to 10%, from 7% to 8%, from 7% to 9%, from 7% to 10%, from 8% to 9%, from 8% to 10%, or from 9% to 10%, and the like. In further embodiments, the aqueous solution of whey proteins in step (a) can be provided at a concentration in a range of at least 6%. In still further embodiments, the aqueous solution of whey proteins in step (a) can be provided at a concentration in a range from at least 2%. In yet further embodiments, the aqueous solution of whey proteins in step (a) can be provided at a concentration in a range from at least 3%.

The pH of the aqueous solution of whey proteins provided at step (a) is neutral in a range from 6.0 to 7.5. In a further embodiment, the pH at step (a) is neutral in a range from 6.5 to 7.5. In a still further embodiment, the pH at step (a) is neutral in a range from 6.0 to 6.5. In other embodiments, the pH at step (a) is neutral in a range from 6.0 to 6.2. Thus, the pH at step (a) can be 6.0, 6.1, 6.2, 6.3, 6.4, 6.5, 6.6, 6.7, 6.8, 6.9, 7.0, 7.1, 7.2, 7.3, 7.4 or 7.5 and the like. Accordingly, in one embodiment, the pH at step (a) is 7.0. In another embodiment, the pH at step (a) is 6.2. In other embodiments, the pH at step (a) can be at a neutral pH in range from 6.0 to 6.3, 6.0 to 6.4, 6.0 to 6.6, 6.0 to 6.8, 6.0 to 7.0, 6.0 to 7.2, 6.1 to 6.3, 6.1 to 6.5, 6.1 to 6.8, 6.1 to 7.0, 6.1 to 7.2, 6.1 to 7.5, 6.2 to 6.4, 6.2 to 6.6, 6.2 to 6.8, 6.2 to 7.0, 6.2 to 7.2, 6.2 to 7.5, 6.3 to 6.5, 6.3 to 6.6, 6.3 to 6.8, 6.3 to 7.0, 6.3 to 7.2, 6.3 to 7.5, 6.4 to 6.6, 6.4 to 6.8, 6.4 to 7.0, 6.4 to 7.2, 6.4 to 7.5, 6.5 to 6.7, 6.5 to 6.8, 6.5 to 7.0, 6.5 to 7.2, 6.5 to 7.4, 6.6 to 6.8, 6.6 to 7.0, 6.6 to 7.2, 6.6 to 7.5, 6.8 to 7.0, 6.8 to 7.2, 6.8 to 7.4, 6.8 to 7.5, 7.0 to 7.2, 7.0 to 7.3, 7.0 to 7.5, 7.2 to 7.4, 7.2 to 7.5, 7.3 to 7.5, and the like.

As noted above, the neutral pH of the aqueous solution of whey proteins can be adjusted at step (d) to be a neutral pH that is the same, or higher or lower than the neutral pH at step (a). Thus, in some embodiments, the neutral pH at step (d) can be the same as the neutral pH at step (a). In other embodiments of the invention, the neutral pH at step (d) can be higher than the neutral pH at step (a). In still other embodiments of the invention, the neutral pH at step (d) can be lower than the neutral pH at step (a).

Thus, the pH of the aqueous solution of whey proteins can be adjusted at step (d) to be neutral in a range from 6.0 to 7.5. In a further embodiment, the pH at step (d) can be adjusted to a neutral in a range from 6.5 to 7.5. In a still further embodiment, the pH at step (d) can be adjusted to a neutral in a range from 6.0 to 6.5. In other embodiments, the pH at step (d) is adjusted to be neutral in a range from 6.0 to 6.2. Thus, the adjusted pH at step (d) can be 6.0, 6.1, 6.2, 6.3, 6.4, 6.5, 6.6, 6.7, 6.8, 6.9, 7.0, 7.1, 7.2, 7.3, 7.4 or 7.5 and the like. Accordingly, in one embodiment, the adjusted pH at step (d) is 6.2. In other embodiments, the adjusted pH at step (d) can be at a neutral pH in range from 6.0 to 6.3, 6.0 to 6.4, 6.0 to 6.6, 6.0 to 6.8, 6.0 to 7.0, 6.0 to 7.2, 6.1 to 6.3, 6.1 to 6.5, 6.1 to 6.8, 6.1 to 7.0, 6.1 to 7.2, 6.1 to 7.5, 6.2 to 6.4, 6.2 to 6.6, 6.2 to 6.8, 6.2 to 7.0, 6.2 to 7.2, 6.2 to 7.5, 6.3 to 6.5, 6.3 to 6.6, 6.3 to 6.8, 6.3 to 7.0, 6.3 to 7.2, 6.3 to 7.5, 6.4 to 6.6, 6.4 to 6.8, 6.4 to 7.0, 6.4 to 7.2, 6.4 to 7.5, 6.5 to 6.7, 6.5 to 6.8, 6.5 to 7.0, 6.5 to 7.2, 6.5 to 7.4, 6.6 to 6.8, 6.6 to 7.0, 6.6 to 7.2, 6.6 to 7.5, 6.8 to 7.0, 6.8 to 7.2, 6.8 to 7.4, 6.8 to 7.5, 7.0 to 7.2, 7.0 to 7.3, 7.0 to 7.5, 7.2 to 7.4, 7.2 to 7.5, 7.3 to 7.5, and the like.

As mentioned above, one aspect of the present invention is a method for producing a thermal stable whey protein beverage further comprising adding at least one anionic polysaccharide. Thus, in some aspects of the present invention, the at least one anionic polysaccharide is added at step (a) or step (b); thus, prior to or during heating. The addition of at least one anionic polysaccharide in the methods of the present invention is particularly advantageous when the pH of the aqueous solution of whey proteins is neutral in a range from about 6.0 to about 6.5. Thus, at a neutral pH of 6.0 to 6.5, the addition of the anionic polysaccharide results in a thermal stable whey protein beverage having reduced viscosity as compared to whey protein beverages having a neutral pH in a range from 6.0 to 6.5 but without added anionic polysaccharide.

The anionic polysaccharides of the present invention include, but are not limited to, carrageenan, pectin, dextran sulfate, alginates, carboxylated starches, carboxy-($C_1$-$C_6$ alkyl) cellulose (such as carboxylethyl cellulose), gellans, hyaluronic acid, and xanthans and/or any other anionic polysaccharide useful in the present invention. Accordingly, in some embodiments, the at least one anionic polysaccharide is selected from the group consisting of carrageenan, pectin, and dextran sulfate.

The at least one anionic polysaccharide of the present invention can be provided at a concentration in a range of 0.01% weight percent (w/w) to 1.0% weight percent (w/w). Thus, the anionic polysaccharide in step (a) or step (b) can be provided at a concentration in weight percent of 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, or 1.0%, and the like. In other embodiments, the anionic polysaccharide in step (a) or step (b) can be provided at a concentration in weight percent in a range from 0.01% to 0.03%, from 0.01% to 0.05%, from 0.01% to 0.07%, from 0.01% to 0.09%, from 0.01% to 0.1%, from 0.01% to 0.2%, from 0.01% to 0.4%, from 0.01% to 0.6%, from 0.01% to 0.8%, from 0.01% to 1.0%, 0.02% to 0.05%, from 0.02% to 0.07%, from 0.02% to 0.09%, from 0.02% to 0.1%, from 0.02% to 0.2%, from 0.02% to 0.4%, from 0.02% to 0.6%, from 0.02% to 0.8%, from 0.02% to 1.0%, 0.03% to 0.05%, from 0.03% to 0.07%, from 0.03% to 0.09%, from 0.03% to 0.1%, from 0.03% to 0.2%, from 0.03% to 0.4%, from 0.03% to 0.6%, from 0.03% to 0.8%, from 0.03% to 0.9%, from 0.03% to 1.0%, from 0.04% to 0.07%, from 0.04% to 0.09%, from 0.04% to 0.1%, from 0.04% to 0.2%, from 0.04% to 0.4%, from 0.04% to 0.6%, from 0.04% to 0.8%, from 0.04% to 1.0%, from 0.05% to 0.07%, 0.05% to 0.09%, from 0.05% to 0.1%, from 0.05% to 0.2%, from 0.05% to 0.4%, from 0.05% to 0.6%, from 0.05% to 0.8%, from 0.05% to 1.0%, from 0.06% to 0.08%, 0.06% to 0.1%, from 0.06% to 0.2%, from 0.06% to 0.4%, from 0.06% to 0.6%, from 0.06% to 0.8%, from 0.06% to 1.0%, from 0.07% to 0.09%, from 0.07% to 0.1%, from 0.07% to 0.2%, from 0.07% to 0.4%, from 0.07% to 0.6%, from 0.07% to 0.8%, from 0.07% to 1.0%, from 0.08% to 0.1%, from 0.08% to 0.2%, from 0.08% to 0.4%, from 0.08% to 0.6%, from 0.08% to 0.8%, from 0.08% to 1.0%, from 0.09% to 0.1%, from 0.09% to 0.2%, from 0.09% to 0.4%, from 0.09% to 0.6%, from 0.09% to 0.8%, from 0.09% to 1.0%, from 0.1% to 0.2%, from 0.1% to 0.4%, from 0.1% to 0.6%, from 0.1% to 0.8%, from 0.2% to 0.4%, from 0.2% to 0.6%, from 0.2% to 0.8%, from 0.2% to 1.0%, from 0.3% to 0.5%, from 0.3% to 0.7%, from 0.3% to 0.9%, from 0.3% to 1.0%, from 0.4% to 0.6%, from 0.4% to 0.8%, from 0.4% to 1.0%, from 0.5% to 0.7%, from 0.5% to 0.8%, from 0.5% to 1.0%, from 0.6% to 0.8%, from 0.6% to 1.0%, from 0.7% to 0.9%, from 0.7% to 1.0%, or from 0.8% to 1.0%, and the like.

The heating of the aqueous solution in step (b) can be carried out at a temperature in a range from about 70° C. to about 150° C. In some embodiments, the heating of the aqueous solution in step (b) can be carried out at a temperature in a range from about 75° C. to about 150° C. In other embodiments, the heating of the aqueous solution in step (b) can be carried out at a temperature in a range from about 75° C. to about 95° C. Thus, the temperature for the heating of the aqueous solution in step (b) can be 70° C., 71° C., 72° C., 73° C., 74° C., 75° C., 76° C., 77° C., 78° C., 79° C., 80° C., 81° C., 82° C., 83° C., 84° C., 85° C., 86° C., 87° C., 88° C., 89° C., 90° C., 91° C., 92° C., 93° C., 94° C., 95° C., 97° C., 98° C., 99° C., 100° C., 101° C., 102° C., 103° C., 104° C., 105° C., 106° C., 107° C., 108° C., 109° C., 110° C., 111° C., 112° C., 113° C., 114° C., 115° C., 116° C., 117° C., 118° C., 119° C., 120° C., 121° C., 122° C., 123° C., 124° C., 125° C., 126° C., 127° C., 128° C., 129° C., 130° C., 131° C., 132° C., 133° C., 134° C., 135° C., 136° C., 137° C., 138° C., 139° C., 140° C., 141° C., 142° C., 143° C., 144° C., 145° C., 146° C., 147° C., 148° C., 149° C., or 150° C., and the like. In some embodiments of the present invention, the heating of the aqueous solution in step (b) can be in a range from 70° C. to 75° C., 70° C. to 80° C., 70° C. to 85° C., 70° C. to 90° C., 70° C. to 95° C., 70° C. to 100° C., 70° C. to 105° C., 70° C. to 110° C., 70° C. to 115° C., 70° C. to 120° C., 70° C. to 125° C., 70° C. to 130° C., 70° C. to 135° C., 70° C. to 140° C., 70° C. to 145° C., 75° C. to 80° C., 75° C. to 85° C., 75° C. to 90° C., 75° C. to 100° C., 75° C. to 105° C., 75° C. to 110° C., 75° C. to 115° C., 75° C. to 120° C., 75° C. to 125° C., 75° C. to 130° C., 75° C. to 135° C., 75° C. to 140° C., 75° C. to 145° C., 80° C. to 85° C., 80° C. to 90° C., 80° C. to 95° C., 80° C. to 100° C., 80° C. to 105° C., 80° C. to 110° C., 80° C. to 115° C., 80° C. to 120° C., 80° C. to 125° C., 80° C. to 130° C., 80° C. to 135° C., 80° C. to 140° C., 80° C. to 145° C., 80° C. to 150° C., 85° C. to 90° C., 85° C. to 95° C., 85° C. to 100° C., 85° C. to 105° C., 85° C. to 110° C., 85° C. to 115° C., 85° C. to 120° C., 85° C. to 125° C., 85° C. to 130° C., 85° C. to 135° C., 85° C. to 140° C., 85° C. to 145° C., 85° C. to 150° C., 90° C. to 95° C., 90° C. to 100° C., 90° C. to 105° C., 90° C. to 110° C., 90° C. to 115° C., 90° C. to 120° C., 90° C. to 125° C., 90° C. to 130° C., 90° C. to 135° C., 90° C. to 140° C., 90° C. to 145° C., 90° C. to 150° C., 95° C. to 100° C., 95° C. to 105° C., 95° C. to 110° C., 95° C. to 115° C., 95° C. to 120° C., 95° C. to 125° C., 95° C. to 130° C., 95° C. to 135° C., 95° C. to 140° C., 95° C. to 145° C., 95° C. to 150° C., 100° C. to 105° C., 100° C. to 110° C., 100° C. to 115° C., 100° C. to 120° C., 100° C. to 125° C., 100° C. to 130° C., 100° C. to 135° C., 100° C. to 140° C., 100° C. to 145° C., 100° C. to 150° C., 105° C. to 110° C., 105° C. to 115° C., 105° C. to 120° C., 105° C. to 125° C., 105° C. to 130° C., 105° C. to 135° C., 105° C. to 140° C., 105° C. to 145° C., 105° C. to 150° C., 110° C. to 115° C., 110° C. to 120° C., 110° C. to 125° C., 110° C. to 130° C., 110° C. to 135° C., 110° C. to 140° C., 110° C. to 145° C., 110° C. to 150° C., 115° C. to 120° C., 115° C. to 125° C., 115° C. to 130° C., 115° C. to 135° C., 115° C. to 140° C., 115° C. to 145° C., 115° C. to 150° C., 120° C. to 125° C., 120° C. to 130° C., 120° C. to 135° C., 120° C. to 140° C., 120° C. to 145° C., 120° C. to 150° C., 125° C. to 130° C., 125° C. to 135° C., 125° C. to 140° C., 130° C. to 135° C., 130° C. to 140° C., or 130° C. to 145° C., 130° C. to 150° C., 135° C. to 140° C., 135° C. to 145° C., 135° C. to 150° C., 140° C. to 145° C., 140° C. to 150° C., or 145° C. to 150° C., and the like.

The heating of the aqueous solution in step (b) can last from 2 seconds to 30 minutes. Thus, the heating of the aqueous solution in step (b) can last for 2 sec., 3 sec. 4, sec., 5 sec., 6 sec., 7 sec. 8, sec., 9 sec., 10 sec., 15 sec., 20 sec., 25 sec., 30 sec. 35 sec., 40 sec., 45 sec., 50 sec., 55 sec., 1 min., 2 min., 3 min., 4 min., 5 min., 6 min., 7 min., 8 min., 9 min., 10 min., 11 min., 12 min., 13 min., 14 min., 15 min., 16 min., 17 min., 18 min., 19 min., 20 min., 21 min., 22 min., 23 min., 24 min., 25 min., 26 min., 27 min., 28 min., 29 min., or 30 min., and the like. In some embodiments of the present invention, the heating of the aqueous solution in step (b) can last for a range of time from about 2 sec. to 10 sec., 2 sec. to 15 sec., 2 sec. to 30 sec., 2 sec. to 1 min., 2 sec. to 5 min., 2 sec. to 10 min., 2 sec. to 15 min., 2 sec. to 20 min., 2 sec. to 25 min., 10 sec. to 15 sec., 10 sec. to 30 sec., 10 sec. to 1 min., 10 sec. to 5 min., 10 sec. to 10 min., 10 sec. to 15 min., 10 sec. to 20 min., 10 sec. to 25 min., 10 sec. to 30 min., 30 sec. to 1 min., 30 sec. to 5 min., 30 sec. to 10 min., 30 sec. to 15 min., 30 sec. to 20 min., 30 sec. to 25 min., 30 sec. to 30 min., 1 min. to 5 min., 1 min. to 10 min., 1 min. to 15 min., 1 min. to 20 min., 1 min. to 25 min., 1 min. to 30 min., 5 min. to 10 min., 5 min. to 15 min., 5 min. to 20 min., 5 min. to 25 min., 5 min. to 30 min., 10 min. to 15 min., 10 min. to 20 min., 10 min. to 25 min., 10 min. to 30 min., 15 min. to 20 min., 15 min. to 25 min., 15 min. to 30 min., 20 min. to 25 min., 20 min. to 30 min., or 25 min. to 30 min., and the like.

The cooling of the aqueous solution of whey proteins of the present invention can be to a temperature of 0° C. to 20° C. Thus, the cooling in step (c) can be to a temperature of 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C. or 20° C. and the like. In some embodiments of the present invention, the cooling of the aqueous solution in step (c) can be to a temperature in a range from 0° C. to 5° C., 0°

C. to 10° C., 0° C. to 15° C., 5° C. to 10° C., 5° C. to 15° C., 5° C. to 20° C., 10° C. to 15° C., 10° C. to 20° C., or 15° C. to 20° C., and the like.

The cooling of the aqueous solution of whey proteins of step (c) can last from about 1 minute to about 30 minutes. Thus, the cooling of the aqueous solution in step (c) can last for 1 min., 2 min., 3 min., 4 min., 5 min., 6 min., 7 min., 8 min., 9 min., 10 min., 11 min., 12 min., 13 min., 14 min., 15 min., 16 min., 17 min., 18 min., 19 min., 20 min., 21 min., 22 min., 23 min., 24 min., 25 min., 26 min., 27 min., 28 min., 29 min., or 30 min., and the like. In some embodiments of the present invention, the cooling of the aqueous solution of whey proteins in step (c) can last for a range of time from 1 min. to 5 min., 1 min. to 10 min., 1 min. to 15 min., 1 min. to 20 min., 1 min to 25 min., 5 min. to 10 min., 5 min. to 15 min., 5 min. to 20 min., 5 min. to 25 min., 5 min. to 30 min., 10 min. to 15 min., 10 min. to 20 min., 10 min. to 25 min., 10 min. to 30 min., 15 min. to 20 min., 15 min. to 25 min., 15 min. to 30 min., 20 min. to 25 min., or 20 min. to 30 min., and the like.

The mineral salts of the present invention include, but are not limited to, sodium chloride, potassium chloride, sodium citrate, and soluble calcium salts including, but not limited to, calcium chloride and calcium sulfate, and/or any other mineral salt useful in the present invention. Accordingly, in one embodiment, the at least one mineral salt is selected from the group consisting of sodium chloride, potassium chloride, calcium chloride, calcium sulfate, sodium citrate, and any combination thereof. In some aspects of the present invention, the at least one mineral salt is sodium chloride. In other aspects of the present invention, the at least one mineral salt is potassium chloride. In further embodiments, the at least one mineral salt is a combination of sodium citrate and calcium chloride. In still further embodiments, the at least one mineral salt is a combination of sodium citrate and calcium sulfate.

In one embodiment of the present invention, when the at least one mineral salt is sodium chloride, the concentration of the sodium chloride can be up to 60 mM. In other embodiments, the concentration of the sodium chloride can be in a range from 10 mM to 60 mM. Thus, the concentration of sodium chloride used in the present invention can be 10 mM, 11 mM, 12 mM, 13 mM, 14 mM, 15 mM, 16 mM, 17 mM, 18 mM, 19 mM, 20 mM, 21 mM, 22 mM, 23 mM, 24 mM, 25 mM, 26 mM, 27 mM, 28 mM, 29 mM, 30 mM, 31 mM, 32 mM, 33 mM, 34 mM, 35 mM, 36 mM, 37 mM, 38 mM, 39 mM, 40 mM, 41 mM, 42 mM, 43 mM, 44 mM, 45 mM, 46 mM, 47 mM, 48 mM, 49 mM, 50 mM, 51 mM, 52 mM, 53 mM, 54 mM, 55 mM, 56 mM, 57 mM, 58 mM, 59 mM, or 60 mM, and the like.

In other embodiments, the concentration of sodium chloride used in the present invention can be in a range from 10 mM to 15 mM, 10 mM to 20 mM, 10 mM to 25 mM, 10 mM to 30 mM, 10 mM to 35 mM, to 10 mM to 40 mM, 10 mM to 45 mM, to 10 mM to 50 mM, 10 mM to 55 mM, 15 mM to 20 mM, 15 mM to 25 mM, 15 mM to 30 mM, 15 mM to 35 mM, 15 mM to 40 mM, 15 mM to 45 mM, 15 mM to 50 mM, 15 mM to 55 mM, 15 mM to 60 mM, 20 mM to 25 mM, 20 mM to 30 mM, 20 mM to 35 mM, 20 mM to 40 mM, 20 mM to 45 mM, 20 mM to 50 mM, 20 mM to 55 mM, 20 mM to 60 mM, 30 mM to 35 mM, 30 mM to 40 mM, 30 mM to 45 mM, 30 mM to 50 mM, 30 mM to 55 mM, 30 mM to 60 mM, 35 mM to 40 mM, 35 mM to 45 mM, 35 mM to 50 mM, 35 mM to 55 mM, 35 mM to 60 mM, 40 mM to 45 mM, 40 mM to 50 mM, 40 mM to 55 mM, 40 mM to 60 mM, 45 mM to 50 mM, 45 mM to 55 mM, 45 mM to 60 mM, 50 mM to 55 mM, 50 mM to 60 mM, or 55 mM to 60 mM, and the like.

In a further embodiment of the present invention, when the at least one mineral salt is potassium chloride, the concentration of the potassium chloride can be up to 60 mM. In other embodiments, the concentration of the potassium chloride can be in a range from 10 mM to 60 mM. Thus, the concentration of potassium chloride used in the present invention can be 10 mM, 11 mM, 12 mM, 13 mM, 14 mM, 15 mM, 16 mM, 17 mM, 18 mM, 19 mM, 20 mM, 21 mM, 22 mM, 23 mM, 24 mM, 25 mM, 26 mM, 27 mM, 28 mM, 29 mM, 30 mM, 31 mM, 32 mM, 33 mM, 34 mM, 35 mM, 36 mM, 37 mM, 38 mM, 39 mM, 40 mM, 41 mM, 42 mM, 43 mM, 44 mM, 45 mM, 46 mM, 47 mM, 48 mM, 49 mM, 50 mM, 51 mM, 52 mM, 53 mM, 54 mM, 55 mM, 56 mM, 57 mM, 58 mM, 59 mM, or 60 mM, and the like.

In still further embodiments, the concentration of potassium chloride used in the present invention can be in a range from 10 mM to 15 mM, 10 mM to 20 mM, 10 mM to 25 mM, 10 mM to 30 mM, 10 mM to 35 mM, to 10 mM to 40 mM, 10 mM to 45 mM, to 10 mM to 50 mM, 10 mM to 55 mM, 15 mM to 20 mM, 15 mM to 25 mM, 15 mM to 30 mM, 15 mM to 35 mM, 15 mM to 40 mM, 15 mM to 45 mM, 15 mM to 50 mM, 15 mM to 55 mM, 15 mM to 60 mM, 20 mM to 25 mM, 20 mM to 30 mM, 20 mM to 35 mM, 20 mM to 40 mM, 20 mM to 45 mM, 20 mM to 50 mM, 20 mM to 55 mM, 20 mM to 60 mM, 30 mM to 35 mM, 30 mM to 40 mM, 30 mM to 45 mM, 30 mM to 50 mM, 30 mM to 55 mM, 30 mM to 60 mM, 35 mM to 40 mM, 35 mM to 45 mM, 35 mM to 50 mM, 35 mM to 55 mM, 35 mM to 60 mM, 40 mM to 45 mM, 40 mM to 50 mM, 40 mM to 55 mM, 40 mM to 60 mM, 45 mM to 50 mM, 45 mM to 55 mM, 45 mM to 60 mM, 50 mM to 55 mM, 50 mM to 60 mM, or 55 mM to 60 mM, and the like.

In other embodiments of the invention, the at least one mineral salt is a combination of sodium citrate and a soluble calcium salt such as calcium chloride or calcium sulfate. Thus, in some embodiments of the invention, the at least one mineral salt is a combination of sodium citrate and calcium chloride, wherein the concentration of sodium citrate and calcium chloride are each up to 20 mM. In further embodiments, the concentration of sodium citrate and calcium chloride are each in a range from 7 mM to 20 mM. Thus, in some embodiments of the present invention, the sodium citrate and calcium chloride can be each at a concentration of about 7 mM, about 8 mM, about 9 mM, 10 mM, 11 mM, 12 mM, 13 mM, 14 mM, 15 mM, 16 mM, 17 mM, 18 mM, 19 mM, or 20 mM and the like.

In a further aspect of the present invention, the concentration for sodium citrate and calcium chloride each can be in a range from 7 mM to 10 mM, 7 mM to 12 mM, 7 mM to 15 mM, 7 mM to 17 mM, 7 mM to 20 mM, 8 mM to 10 mM, 8 mM to 12 mM, 8 mM to 15 mM, 8 mM to 18 mM, 8 mM to 20 mM, 9 mM to 12 mM, 9 mM to 15 mM, 9 mM to 18 mM, 9 mM to 20 mM, 10 mM to 12 mM, 10 mM to 15 mM, 10 mm to 17 mM, 10 mM to 20 mM, 11 mM to 13 mM, 11 mM to 15 mM, 11 mM to 18 mM, 11 mM to 20 mM, 12 mM to 15 mM, 12 mM to 17 mM, 12 mM to 18 mM, 12 mM to 20 mM, 13 mM to 15 mM, 13 mM to 17 mM, 13 mM to 18 mM, 13 mM to 19 mM, 13 mM to 20 mM, 14 mM to 17 mM, 14 mM to 19 mM, 14 mM to 20 mM, 15 mM to 17 mM, 15 mM to 18 mM, 15 mM to 19 mM, 15 mM to 20 mM, 16 mM to 18 mM, 16 mM to 19 mM, 16 mM to 20 mM, 17 mM to 19 mM, 17 mM to 20 mM, or 18 mM to 20 mM, and the like.

The present invention further provides an aspect in which the at least one mineral salt is a combination of sodium citrate and calcium sulfate, wherein the concentration of sodium citrate and calcium sulfate are each up to 20 mM. In additional aspects of the present invention, the concentration of sodium citrate and calcium sulfate are each in a range from 7 mM to 20 mM. Thus, in some aspects of the present invention, the sodium citrate and calcium sulfate can be each at a concentration of 7 mM, 8 mM, 9 mM, 10 mM, 11 mM, 12 mM, 13 mM, 14 mM, 15 mM, 16 mM, 17 mM, 18 mM, 19 mM, or 20 mM and the like.

In a further aspect of the present invention, the concentration for sodium citrate and calcium sulfate each can be in a range from 7 mM to 10 mM, 7 mM to 12 mM, 7 mM to 15 mM, 7 mM to 17 mM, 7 mM to 20 mM, 8 mM to 10 mM, 8 mM to 12 mM, 8 mM to 15 mM, 8 mM to 18 mM, 8 mM to 20 mM, 9 mM to 12 mM, 9 mM to 15 mM, 9 mM to 18 mM, 9 mM to 20 mM, 10 mM to 12 mM, 10 mM to 15 mM, 10 mm to 17 mM, 10 mM to 20 mM, 11 mM to 13 mM, 11 mM to 15 mM, 11 mM to 18 mM, 11 mM to 20 mM, 12 mM to 15 mM, 12 mM to 17 mM, 12 mM to 18 mM, 12 mM to 20 mM, 13 mM to 15 mM, 13 mM to 17 mM, 13 mM to 18 mM, 13 mM to 19 mM, 13 mM to 20 mM, 14 mM to 17 mM, 14 mM to 19 mM, 14 mM to 20 mM, 15 mM to 17 mM, 15 mM to 18 mM, 15 mM to 19 mM, 15 mM to 20 mM, 16 mM to 18 mM, 16 mM to 19 mM, 16 mM to 20 mM, 17 mM to 19 mM, 17 mM to 20 mM, or 18 mM to 20 mM, and the like.

The heating in step (e) can be carried out at a temperature in a range from 70° C. to 150° C. In some embodiments, the heating in step (e) is carried out at a temperature in a range from 75° C. to 150° C. Thus, the temperature for the heating in step (e) can be 70° C., 71° C., 72° C., 73° C., 74° C., 75° C., 76° C., 77° C., 78° C., 79° C., 80° C., 81° C., 82° C., 83° C., 84° C. 85° C., 86° C., 87° C., 88° C., 89° C., 90° C., 91° C., 92° C., 93° C., 94° C., 95° C., 97° C., 98° C., 99° C., 100° C., 101° C., 102° C., 103° C., 104° C., 105° C., 106° C., 107° C., 108° C., 109° C., 110° C., 111° C., 112° C., 113° C., 114° C., 115° C., 116° C., 117° C., 118° C., 119° C., 120° C., 121° C., 122° C., 123° C., 124° C., 125° C., 126° C., 127° C., 128° C., 129° C., 130° C., 131° C., 132° C., 133° C., 134° C., 135° C., 136° C., 137° C., 138° C., 139° C., 140° C., 141° C., 142° C., 143° C., 144° C., 145° C., 146° C., 147° C., 148° C., 149° C., or 150° C., and the like. In some embodiments of the present invention, the heating of the aqueous solution in step (e) can be in a range from 70° C. to 75° C., 70° C. to 80° C., 70° C. to 85° C., 70° C. to 90° C., 70° C. to 95° C., 70° C. to 100° C., 70° C. to 105° C., 70° C. to 110° C., 70° C. to 115° C., 70° C. to 120° C., 70° C. to 125° C., 70° C. to 130° C., 70° C. to 135° C., 70° C. to 140° C., 70° C. to 145° C., 75° C. to 80° C., 75° C. to 85° C., 75° C. to 90° C., 75° C. to 100° C., 75° C. to 105° C., 75° C. to 110° C., 75° C. to 115° C., 75° C. to 120° C., 75° C. to 125° C., 75° C. to 130° C., 75° C. to 135° C., 75° C. to 140° C., 75° C. to 145° C., 80° C. to 85° C., 80° C. to 90° C., 80° C. to 95° C., 80° C. to 100° C., 80° C. to 105° C., 80° C. to 110° C., 80° C. to 115° C., 80° C. to 120° C., 80° C. to 125° C., 80° C. to 130° C., 80° C. to 135° C., 80° C. to 140° C., 80° C. to 145° C., 80° C. to 150° C., 85° C. to 90° C., 85° C. to 95° C., 85° C. to 100° C., 85° C. to 105° C., 85° C. to 110° C., 85° C. to 115° C., 85° C. to 120° C., 85° C. to 125° C., 85° C. to 130° C., 85° C. to 135° C., 85° C. to 140° C., 85° C. to 145° C., 85° C. to 150° C., 90° C. to 95° C., 90° C. to 100° C., 90° C. to 105° C., 90° C. to 110° C., 90° C. to 115° C., 90° C. to 120° C., 90° C. to 125° C., 90° C. to 130° C., 90° C. to 135° C., 90° C. to 140° C., 90° C. to 145° C., 90° C. to 150° C., 95° C. to 100° C., 95° C. to 105° C., 95° C. to 110° C., 95° C. to 115° C., 95° C. to 120° C., 95° C. to 125° C., 95° C. to 130° C., 95° C. to 135° C., 95° C. to 140° C., 95° C. to 145° C., 95° C. to 150° C., 100° C. to 105° C., 100° C. to 110° C., 100° C. to 115° C., 100° C. to 120° C., 100° C. to 125° C., 100° C. to 130° C., 100° C. to 135° C., 100° C. to 140° C., 100° C. to 145° C., 100° C. to 150° C., 105° C. to 110° C., 105° C. to 115° C., 105° C. to 120° C., 105° C. to 125° C., 105° C. to 130° C., 105° C. to 135° C., 105° C. to 140° C., 105° C. to 145° C., 105° C. to 150° C., 110° C. to 115° C., 110° C. to 120° C., 110° C. to 125° C., 110° C. to 130° C., 110° C. to 135° C., 110° C. to 140° C., 110° C. to 145° C., 110° C. to 150° C., 115° C. to 120° C., 115° C. to 125° C., 115° C. to 130° C., 115° C. to 135° C., 115° C. to 140° C., 115° C. to 145° C., 115° C. to 150° C., 120° C. to 125° C., 120° C. to 130° C., 120° C. to 135° C., 120° C. to 140° C., 120° C. to 145° C., 120° C. to 150° C., 125° C. to 130° C., 125° C. to 135° C., 125° C. to 140° C., 130° C. to 135° C., 130° C. to 140° C., or 130° C. to 145° C., 130° C. to 150° C., 135° C. to 140° C., 135° C. to 145° C., 135° C. to 150° C., 140° C. to 145° C., 140° C. to 150° C., or 145° C. to 150° C., and the like.

The heating in step (e) can last from about 2 seconds to about 30 minutes. Thus, the heating in step (e) can last, for example, for 2 sec., 3 sec. 4, sec., 5 sec., 6 sec., 7 sec. 8, sec., 9 sec., 10 sec., 15 sec., 20 sec., 25 sec., 30 sec. 35 sec., 40 sec., 45 sec., 50 sec., 55 sec., 1 min., 2 min., 3 min., 4 min., 5 min., 6 min., 7 min., 8 min., 9 min., 10 min., 11 min., 12 min., 13 min., 14 min., 15 min., 16 min., 17 min., 18 min., 19 min., 20 min., 21 min., 22 min., 23 min., 24 min., 25 min., 26 min., 27 min., 28 min., 29 min., or 30 min., and the like.

In other embodiments of the present invention, the heating in step (e) can last for a range of time from 2 sec. to 10 sec., 2 sec. to 15 sec., 2 sec. to 30 sec., 2 sec. to 1 min., 2 sec. to 5 min., 2 sec. to 10 min., 2 sec. to 15 min., 2 sec. to 20 min., 2 sec. to 25 min., 10 sec. to 15 sec., 10 sec. to 30 sec., 10 sec. to 1 min., 10 sec. to 5 min., 10 sec. to 10 min., 10 sec. to 15 min., 10 sec. to 20 min., 10 sec. to 25 min., 10 sec. to 30 min., 30 sec. to 1 min., 30 sec. to 5 min., 30 sec. to 10 min., 30 sec. to 15 min., 36 sec. to 20 min., 30 sec. to 25 min., 30 sec. to 30 min., 1 min. to 5 min., 1 min. to 10 min., 1 min. to 15 min., 1 min. to 20 min., 1 min. to 25 min., 1 min. to 30 min., 5 min. to 10 min., 5 min. to 15 min., 5 min. to 20 min., 5 min. to 25 min., 5 min. to 30 min., 10 min. to 15 min., 10 min. to 20 min., 10 min. to 25 min., 100 min. to 30 min., 15 min. to 20 min., 15 min. to 25 min., 15 min. to 30 min., 20 min. to 25 min., 20 min. to 30 min., or 25 min. to 30 min., and the like.

Accordingly, one aspect of the present invention is a method for producing a thermal stable whey protein beverage comprising: (a) providing an aqueous solution of at least 2% whey proteins and having a neutral pH; then (b) heating said aqueous solution of whey proteins to at least 75° C.; then (c) cooling said aqueous solution of whey proteins to at least about 20° C.; then (d) adding at least one mineral salt; and then (e) heating said aqueous solution of whey protein to at least 75° C. to produce a thermal stable whey protein beverage.

Another aspect of the present invention is a method for producing a thermal stable whey protein beverage comprising: (a) providing an aqueous solution of at least 2% whey proteins and having a neutral pH of 7.0; then (b) heating said aqueous solution of whey proteins to at least 75° C.; then (c) cooling said aqueous solution of whey proteins to at least about 20° C.; then (d) adding sodium chloride at a concentration of at least 10 mM; and then (e) heating said aqueous solution of whey protein to at least 75° C. to produce a thermal stable whey protein beverage.

A further aspect of the present invention is a method for producing a thermal stable whey protein beverage comprising: (a) providing an aqueous solution of at least 2% whey proteins and having a neutral pH of 7.0; then (b) heating said aqueous solution of whey proteins to at least 75° C.; then (c) cooling said aqueous solution of whey proteins to at least 20° C.; then (d) adding calcium chloride and sodium citrate at a concentration of at least 7 mM each; and then (e) heating said aqueous solution of whey protein to at least 75° C. to produce a thermal stable whey protein beverage.

An additional aspect of the invention provides a method for producing a thermal stable whey protein beverage under aseptic processing conditions, or pasteurizing or ultrapasteurizing conditions comprising: (a) providing an aqueous solution of at least 2% whey proteins and having a neutral pH; then (b) heating said aqueous solution of whey proteins to at least 75° C.; then (c) cooling said aqueous solution of whey proteins to at least about 20° C.; then (d) adding at least one mineral salt produce a thermal stable whey protein beverage.

A further aspect of the invention provides a method for producing a thermal stable whey protein beverage under aseptic processing conditions, or pasteurizing or ultrapasteurizing conditions comprising: (a) providing an aqueous solution of at least 2% whey proteins and having a neutral pH of 7.0; then (b) heating said aqueous solution of whey proteins to at least 75° C.; then (c) cooling said aqueous solution of whey proteins to at least about 20° C.; then (d) adding sodium chloride at a concentration of at least 10 mM to produce a thermal stable whey protein beverage.

A still further aspect of the invention provides a method for producing a thermal stable whey protein beverage under aseptic processing conditions, or pasteurizing or ultrapasteurizing conditions comprising: (a) providing an aqueous solution of at least 2% whey proteins and having a neutral pH of 7.0; then (b) heating said aqueous solution of whey proteins to at least 75° C.; then (c) cooling said aqueous solution of whey proteins to at least about 20° C.; then (d) adding calcium chloride and sodium citrate at a concentration of at least 7 mM each to produce a thermal stable whey protein beverage.

Another aspect of the invention is a method for producing a thermal stable whey protein beverage comprising: (a) providing an aqueous solution of at least 2% whey proteins and having a neutral pH, adding at least one anionic polysaccharide; then (b) heating said aqueous solution of whey proteins to at least 75° C.; then (c) cooling said aqueous solution of whey proteins to at least about 20° C.; then (d) adding at least one mineral salt; and then (e) heating said aqueous solution of whey protein to at least 75° C. to produce a thermal stable whey protein beverage. In some embodiments, the at least one anionic polysaccharide can be added at step (b).

A further aspect of the invention is a method for producing a thermal stable whey protein beverage comprising: (a) providing an aqueous solution of at least 2% whey proteins and having a neutral pH in a range from 6.0 to 6.5, adding at least one anionic polysaccharide; then (b) heating said aqueous solution of whey proteins to at least 75° C.; then (c) cooling said aqueous solution of whey proteins to at least about 20° C.; then (d) adding sodium chloride at a concentration of at least 10 mM; and then (e) heating said aqueous solution of whey protein to at least 75° C. to produce a thermal stable whey protein beverage. In some embodiments, the at least one anionic polysaccharide can be added at step (b).

Another aspect of the invention is a method for producing a thermal stable whey protein beverage comprising: (a) providing an aqueous solution of at least 2% whey proteins and having a neutral pH in a range from 6.5 to 7.0, adding at least one anionic polysaccharide; then (b) heating said aqueous solution of whey proteins to at least 75° C.; then (c) cooling said aqueous solution of whey proteins to at least about 20° C.; then (d) adding sodium chloride at a concentration of at least 10 mM at neutral a pH in a range from 6.0 to 6.5; and then (e) heating said aqueous solution of whey protein to at least 75° C. to produce a thermal stable whey protein beverage. In some embodiments, the at least one anionic polysaccharide can be added at step (b).

A further aspect of the invention is a method for producing a thermal stable whey protein beverage comprising: (a) providing an aqueous solution of at least 2% whey proteins and having a neutral pH of 7.0, adding at least one anionic polysaccharide; then (b) heating said aqueous solution of whey proteins to at least 75° C.; then (c) cooling said aqueous solution of whey proteins to at least about 20° C.; then (d) adding sodium chloride at a concentration of at least 10 mM at neutral a pH of 6.2; and then (e) heating said aqueous solution of whey protein to at least 75° C. to produce a thermal stable whey protein beverage. In some embodiments, the at least one anionic polysaccharide can be added at step (b).

A still further aspect of the invention is a method for producing a thermal stable whey protein beverage comprising: (a) providing an aqueous solution of at least 2% whey proteins and having a neutral pH in a range from 6.0 to 6.5, adding at least one anionic polysaccharide; then (b) heating said aqueous solution of whey proteins to at least 75° C.; then (c) cooling said aqueous solution of whey proteins to at least about 20° C.; then (d) adding calcium chloride and sodium citrate at a concentration of at least 7 mM; and then (e) heating said aqueous solution of whey protein to at least 75° C. to produce a thermal stable whey protein beverage. In some embodiments, the at least one anionic polysaccharide is added at step (b).

An additional aspect of the invention is a method for producing a thermal stable whey protein beverage under aseptic processing conditions, or pasteurizing or ultrapasteurizing conditions comprising: (a) providing an aqueous solution of at least 2% whey proteins and having a neutral pH, adding at least one anionic polysaccharide; then (b) heating said aqueous solution of whey proteins to at least 75° C.; then (c) cooling said aqueous solution of whey proteins to at least about 20° C.; and then (d) adding at least one mineral salt to produce a thermal stable whey protein beverage. In some embodiments, the at least one anionic polysaccharide is added at step (b).

A further aspect of the invention is a method for producing a thermal stable whey protein beverage under aseptic processing conditions, or pasteurizing or ultrapasteurizing conditions comprising: (a) providing an aqueous solution of at least 2% whey proteins and having a neutral pH in a range from 6.0 to 6.5, adding at least one anionic polysaccharide; then (b) heating said aqueous solution of whey proteins to at least 75° C.; then (c) cooling said aqueous solution of whey proteins to at least about 20° C.; and then (d) adding sodium chloride at a concentration of at least 10 mM to produce a thermal stable whey protein beverage. In some embodiments, the at least one anionic polysaccharide is added at step (b).

A still further aspect of the invention is a method for producing a thermal stable whey protein beverage under aseptic processing conditions, or pasteurizing or ultrapasteurizing conditions comprising: (a) providing an aqueous solution of at least 2% whey proteins and having a neutral pH in a range from 6.0 to 6.5, adding at least one anionic polysaccharide; then (b) heating said aqueous solution of whey proteins to at least 75° C.; then (c) cooling said aqueous solution of whey proteins to at least about 20° C.; and then (d) adding calcium chloride and sodium citrate at a concentration of at least 7, mM to produce a thermal stable whey protein beverage. In some embodiments, the at least one anionic polysaccharide is added at step (b).

Optionally, in some embodiments of the present invention, at least one additional ingredient can be added at step (d). Additional ingredients of the present invention include, but are not limited to, vitamins, flavor additives, color additives, preservatives, thickeners or stabilizers and sweeteners. Such additional ingredients are well known to those skilled in the art. Accordingly, in some aspects of the present invention, the method for producing a thermal stable whey beverage further comprises adding at least one additional ingredient selected from the group consisting of vitamins, flavor additives, color additives, preservatives, thickeners or stabilizers and sweeteners. Thus, in some aspects, the vitamins can be added at a concentration of 0.01% weight percent (w/w) to 10% weight percent (w/w). In other aspect of the invention, the flavor additives can be added at a concentration in a range from 0.01% (w/w) to 10% (w/w). In still other aspects of the invention, the color additives can be at a concentration in a range from 0.01% (w/w) to 10% (w/w). In yet other aspects of the invention, the preservatives can be added at a concentration in a range from 0.01% (w/w) to 10% (w/w). In additional aspects of the invention, the thickeners or stabilizers can be added at a concentration in a range from 0.01% (w/w) to 10% (w/w). In further aspects of the invention, sweeteners can be added at a concentration in a range from 0.01% (w/w) to 40% (w/w). In still further aspects of the invention, water can be added to balance. As noted above, the addition of one or more of these additives is optional.

Thus, in some embodiments of the present invention, vitamins include, but are not limited to, vitamin A, D2, D3, E (dl-α-tocopherol, d-α-tocopherol) and their derivatives such as palmitic acid ascorbate, stearic acid ascorbate, dipalmitic acid ascorbate, acetic acid-dl-α-tocopherol, nicotinic acid dl-α-tocopherol vitamin E, dl-pantothenlyl alcohol, D-pantothenyl alcohol, pantothenyl ethylether, B1, B2, B6, pyridoxine, pyridoxine HCl, vitamin B12, pantothenic acid, nicotinic acid, nicotinamide, folic acid, vitamin C, vitamin H etc. their salt thereof such as thiamin HCl salt, ascorbic acid Na salt etc or their derivatives thereof such as ascorbic acid-2-phosphonic acid Na salt, ascorbic acid-2-phosphonic acid Mg salt, and any combination thereof.

Flavor additives that can be used with the present invention include, but are not limited to, fruit flavors (e.g., strawberry, raspberry, grape, lime, lemon, orange or banana), mint and/or other herbal flavors, chocolate, vanilla, and any combination thereof.

Color additives that can be used with the present invention include any FDA-approved color additives for food use. A full recitation of all F.D.& C. colorants and their corresponding chemical structures may be found in the Kirk-Othmer Encyclopedia of Chemical Technology, 3rd Edition, in volume 5 at pages 857-884, which text is incorporated herein by reference.

Preservatives that can be used with the present invention include, but are not limited to, p-hydroxybenzoate derivatives (e.g., methyl p-hydroxybenzoate), sorbic acid and benzoic acid (e.g., sodium sorbate, potassium benzoate, sodium benzoate; alkali metal salts), natural preservatives (e.g., nisin or natamycin) and combinations thereof.

Thickeners or stabilizers of the present invention include, but are not limited to, starch, gelatin, pectin, carageenan and cellulose.

Sweeteners that can be used with the present invention include, but are not limited to, honey, sucrose, corn syrup solids, glucose, lactose, galactose, fructose, maltose maltodextrin, saccharine, asulfame K, cyclamates, L-aspartyl-L-phenylalanine lower alkyl ester sweeteners (e.g., aspartame), alitame, neohesperidin dihydrochalcone, tagatose, neotame, stevioside, and sucralose; erythritol, hydrogenated starch hydrolysates, isomalt, maltitol, lactitol, sorbitol, mannitol, xylitol, high-fructose corn syrup, isomaltulose, trehalose, fructooligosaccharides, polydextrose, and any combination thereof.

An additional embodiment of the present invention comprises a step of adding water immediately after the cooling step. In other embodiments, the water is added immediately after the cooling step under aseptic processing conditions, or pasteurizing or ultrapasteurizing conditions.

The present invention further provides a thermal stable whey protein beverage, wherein the thermal stable whey protein beverage comprises: a whey protein concentration of at least 2% at a neutral pH; at least one mineral salt at a concentration of up to 60 mM; a viscosity of from 3 mPa s to 10 mPa s when measured at 50 l/s; and an optical density of 0.050 to 0.400 when measured at 600 nm.

In other embodiments of the invention, the whey protein beverage further comprises whey protein aggregates of a size in a range from $6\times10^6$ Da to $2\times10^7$ Da and a length in a range from 30 nm to 80 nm. In still other embodiments of the invention, the whey protein beverage comprises at least one anionic polysaccharide. In yet other embodiments, the thermal whey protein beverage comprises at least one additive selected from the group consisting of vitamins, flavor additives, color additives, preservatives, thickeners or stabilizers and sweeteners.

In some aspects of the present invention, the concentration of the whey proteins in thermal stable whey protein beverage is in a range of 2% weight percent (w/w) to 10% weight percent (w/w). In other aspects of the present invention, the concentration of the whey proteins in thermal stable whey protein beverage is in a range of 6% weight percent (w/w) to 10% weight percent (w/w). Thus, the concentration in weight percent (w/w) of whey proteins in the thermal stable whey protein beverage can be 2%, 3%, 4%, 5%, 6%, 7%, 8%, 9%, or 10%, and the like. In additional aspects, the concentration in weight percent (w/w) of whey proteins in the thermal stable whey protein beverage is in a range from 2% to 4%, from 2% to 5%, from 2% to 6%, from 2% to 7%, from 2% to 8%, from 2% to 9%, from 2% to 10%, from 3% to 4%, from 3% to 5%, from 3% to 6%, from 3% to 7%, from 3% to 8%, from 3% to 9%, from 3% to 10%, from 4% to 5%, from 4% to 6%, from 4% to 7%, from 4% to 8%, from 4% to 9%, from 4% to 10%, from 5% to 6%, from 5% to 7%, from 5% to 8%, from 5% to 9%, from 5% to 10%, from 6% to 7%, from 6% to 8%, from 6% to 9%, from 6% to 10%, from 7% to 8%, from 7% to 9%, from 7% to 10%, from 8% to 9%, from 8% to 10%, or from 9% to 10%, and the like.

The pH of the thermal stable whey protein beverage is neutral in a range from 6.0 to 7.5. In a further embodiment, the pH is in a neutral range from 6.5 to 7.5. In a still further embodiment, the pH of the thermal stable whey protein beverage is neutral in a range from 6.0 to 6.5. Thus, the pH of the thermal stable whey protein beverage can be 6.0, 6.1, 6.2, 6.3, 6.4, 6.5, 6.6, 6.7, 6.8, 6.9, 7.0, 7.1, 7.2, 7.3, 7.4 or 7.5 and the like. Accordingly, in one embodiment, the pH of the thermal stable whey protein beverage is 7.0. In other embodiments, the pH of the thermal stable whey protein beverage is 6.2. In other embodiments, the pH of the thermal stable whey protein beverage can be in range from 6.0 to 6.1, 6.0 to 6.2, 6.0 to 6.3, 6.0 to 6.4, 6.0 to 6.5, 6.0 to 6.6, 6.0 to 6.8, 6.0 to 7.0, 6.0 to 7.2, 6.0 to 7.5, 6.1 to 6.3, 6.1 to 6.5, 6.1 to 6.8, 6.1 to 7.0, 6.1 to 7.2, 6.1 to 7.5, 6.2 to 6.4, 6.2 to 6.6, 6.2 to 6.8, 6.2 to 7.0, 6.2 to 7.2, 6.2 to 7.5, 6.3 to 6.5, 6.3 to 6.6, 6.3 to 6.8, 6.3 to 7.0, 6.3 to 7.2, 6.3 to 7.5, 6.4 to 6.6, 6.4 to 6.8, 6.4 to 7.0, 6.4 to 7.2, 6.4 to 7.5, 6.5 to 6.7, 6.5 to 6.8, 6.5 to 7.0, 6.5 to 7.2, 6.5 to 7.4, 6.6 to 6.8, 6.6 to 7.0, 6.6 to 7.2, 6.6 to 7.5, 6.8 to 7.0, 6.8 to 7.2, 6.8 to 7.4, 6.8 to 7.5, 7.0 to 7.2, 7.0 to 7.3, 7.0 to 7.5, 7.2 to 7.4, 7.2 to 7.5, or 7.3 to 7.5, and the like.

As described above, the thermal stable whey protein beverage of the present invention has a viscosity of from 3 mPa s to 10 mPa s when measured at 50 l/s. Accordingly, in some embodiments of the present invention, the viscosity of the thermal stable whey protein beverage when measured at 50 l/s is 3 mPa s, 4 mPa s, 5 mPa s, 6 mPa s, 7 mPa s, 8 mPa s, 9 mPa s, 10 mPa s, and the like. In other embodiments, the viscosity of the thermal stable whey protein beverage when measured at 50 l/s is in a range from 3 mPa s to 5 mPa s, 3 mPa s to 6 mPa s, 3 mPa s to 8 mPa s, 3 mPa s to 10 mPa s, 4 mPa s to 6 mPa s, 4 mPa s to 7 mPa s, 4 mPa s to 8 mPa s, 4 mPa s to 9 mPa s, 4 mPa s to 10 mPa s, 5 mPa s to 7 mPa s, 5 mPa s to 8 mPa s, 5 mPa s to 9 mPa s, 5 mPa s to 10 mPa s, 6 mPa s to 8 mPa s, 6 mPa s to 9 mPa s, 6 mPa s to 10 mPa s, 7 mPa s to 8 mPa s, 7 mPa s to 9 mPa s, 7 mPa s to 10 mPa s, 8 mPa s to 9 mPa s, 8 mPa s to 10 mPa s or 9 mPa s to 10 mPa s, and the like.

Further, as described above, the thermal stable whey protein beverage of the present invention has an optical density in a range from 0.050 to 0.400 when measured at 600 nm. Accordingly, in some embodiments of the present invention, the optical density of the thermal stable whey protein beverage when measured at 600 nm can be 0.05, 0.100, 0.0150, 0.200, 0.250, 0.300, 0.350, or 0.400, and the like. Thus, in other embodiments, when measured at 600 nm, the thermal stable whey protein beverage of the present invention has an optical density in a range from 0.050 to 0.100, from 0.050 to 0.150, from 0.050 to 0.200, from 0.050 to 0.250, from 0.050 to 0.300, from 0.050 to 0.350, from 0.100 to 0.150, from 0.100 to 0.200, from 0.100 to 0.250, from 0.100 to 0.300, from 0.100 to 0.350, from 0.100 to 0.400, from 0.150 to 0.200, from 0.150 to 0.250, from 0.150 to 0.300, from 0.150 to 0.350, from 0.150 to 0.400, from 0.200 to 0.250, from 0.200 to 0.300, from 0.200 to 0.350, from 0.200 to 0.400, from 0.300 to 0.350, from 0.300 to 0.400, or from 0.350 to 0.400, and the like.

The thermal stable whey protein beverage of the present invention comprises whey protein aggregates of a size in a range from in a range from $1\times10^6$ Da to $1\times10^8$ Da. In some embodiments, the thermal stable whey protein beverage of the present invention comprises whey protein aggregates of a size in a range from $6\times10^6$ Da to $2\times10^7$. Thus, in some embodiments, the size of the whey proteins is $1\times10^6$ Da, $1.5\times10^6$ Da, $2\times10^6$ Da, $2.5\times10^6$ Da, $3\times10^6$ Da, $3.5\times10^6$ Da, $4\times10^6$ Da, $4.5\times10^6$ Da, $5\times10^6$ Da, $5.5\times10^6$ Da, $6\times10^6$ Da, $6.5\times10^6$ Da, $7\times10^6$ Da, $7.5\times10^6$ Da, $8\times10^6$ Da, $8.5\times10^6$ Da, $9\times10^6$ Da, $9.5\times10^6$ Da, $1\times10^7$ Da, $1.5\times10^7$ Da, $2\times10^7$ Da, $3\times10^7$ Da, $4\times10^7$ Da, $5\times10^7$ Da, $6\times10^7$ Da, $7\times10^7$ Da, $8\times10^7$ Da, or $9\times10^7$ Da, or $1\times10^8$ Da, and the like.

In other embodiments, the size of the whey protein aggregates is in a range from $1\times10^6$ Da to $5\times10^6$ Da, $1\times10^6$ Da to $1\times10^7$ Da, $1\times10^6$ Da to $5\times10^7$ Da, $1\times10^6$ Da to $1\times10^8$ Da, $3\times10^6$ Da to $5\times10^6$ Da, $3\times10^6$ Da to $1\times10^7$ Da, $3\times10^6$ Da to $5\times10^7$ Da, $3\times10^6$ Da to $1\times10^8$ Da, $6\times10^6$ Da to $5\times10^6$ Da, $6\times10^6$ Da to $9\times10^6$ Da, $6\times10^6$ Da to $1\times10^7$ Da, Da, $6\times10^6$ Da to $5\times10^7$ Da, $6\times10^6$ Da to $1\times10^8$ Da, $7\times10^6$ Da to $8\times10^6$ Da, $7\times10^6$ Da to $9\times10^6$ Da, $7\times10^6$ Da to $1\times10^7$ Da, $7\times10^6$ Da to $2\times10^7$ Da, $7\times10^6$ Da to $5\times10^7$ Da, $7\times10^6$ Da to $1\times10^8$ Da, $8\times10^6$ Da to $9\times10^6$ Da, $8\times10^6$ Da to $1\times10^7$ Da, $8\times10^6$ Da to $2\times10^7$ Da, $8\times10^6$ Da to $5\times10^7$ Da, $7\times10^6$ Da to $1\times10^8$ Da, $9\times10^6$ Da to $1\times10^7$ Da, $9\times10^6$ Da to $2\times10^7$ Da, $9\times10^6$ Da to $5\times10^7$ Da, $9\times10^6$ Da to $1\times10^8$ Da, $1\times10^7$ Da to $2\times10^7$ Da, $1\times10^7$ Da to $4\times10^7$ Da, $1\times10^7$ Da to $6\times10^7$ Da, $1\times10^7$ Da to $8\times10^7$, $1\times10^7$ Da to $1\times10^8$ Da, $2\times10^7$ Da to $1\times10^8$ Da, $3\times10^7$ Da to $1\times10^8$ Da, $4\times10^7$ Da to $1\times10^8$ Da, $5\times10^7$ Da to $1\times10^8$ Da, or $6\times10^7$ Da to $1\times10^8$ Da, and the like.

In other embodiments, the length of the whey protein aggregates can be in a range from 10 nm to 100 nm. In still other embodiments the length of the whey protein aggregates can be in a range from 30 nm to 80 nm. Thus, the length of the whey protein aggregates can be 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, or 100 nm, and the like. In further embodiments the length of the whey protein aggregates can be in a range from 10 nm to 20 nm, 10 nm to 40 nm, 10 nm to 60 nm, 10 nm to 80 nm, 20 nm to 40 nm, 20 nm to 60 nm, 20 nm to 80 nm, 20 nm to 100 nm, 30 nm to 60 nm, 30 nm to 80 nm, 30 nm to 100 nm, 40 nm to 60 nm, 40 nm to 80 nm, 40 nm to 100 nm, 50 nm to 80 nm, 50 nm to 100 nm, 60 nm to 80 nm, 60 nm to 100 nm, 70 nm to 90 nm, 70 nm to 100 nm, 80 nm to 100 nm, or 90 nm to 100 nm, and the like.

In some embodiments, the at least one mineral salt of the thermal stable whey protein beverage includes, but is not limited to, sodium chloride, potassium chloride, sodium citrate, soluble calcium salts including, but not limited to, calcium chloride and calcium sulfate, and/or any other mineral salt useful in the present invention. Accordingly, in one embodiment of the present invention, the at least one mineral salt of the thermal stable whey protein is selected from the group consisting of sodium chloride, calcium chloride, sodium citrate and any combination thereof. In some aspects of the present invention, the at least one mineral salt of the thermal stable whey protein beverage is sodium chloride. In other aspects of the present invention, the at least one mineral salt is potassium chloride. In further embodiments, the at least one mineral salt is a combination of sodium citrate and calcium chloride. In still further embodiments, the at least one mineral salt is a combination of sodium citrate and calcium sulfate.

In one embodiment of the present invention, when the at least one mineral salt of the thermal stable whey protein beverage is sodium chloride, the concentration of the sodium chloride can be up to 60 mM. In other embodiments, the concentration of the sodium chloride can be in a range from 10 mM to 60 mM. Thus, the concentration of sodium chloride used in the present invention can be 10 mM, 11 mM, 12 mM, 13 mM, 14 mM, 15 mM, 16 mM, 17 mM, 18 mM, 19 mM, 20 mM, 21 mM, 22 mM, 23 mM, 24 mM, 25 mM, 26 mM, 27 mM, 28 mM, 29 mM, 30 mM, 31 mM, 32 mM, 33 mM, 34 mM, 35 mM, 36 mM, 37 mM, 38 mM, 39 mM, 40 mM, 41 mM, 42 mM, 43 mM, 44 mM, 45 mM, 46 mM, 47 mM, 48 mM, 49 mM, 50 mM, 51 mM, 52 mM, 53 mM, 54 mM, 55 mM, 56 mM, 57 mM, 58 mM, 59 mM, or 60 mM, and the like.

In other embodiments, the concentration of sodium chloride used in the present invention can be in a range from 10 mM to 15 mM, 10 mM to 20 mM, 10 mM to 25 mM, 10 mM to 30 mM, 10 mM to 35 mM, to 10 mM to 40 mM, 10 mM to 45 mM, to 10 mM to 50 mM, 10 mM to 55 mM, 15 mM to 20 mM, 15 mM to 25 mM, 15 mM to 30 mM, 15 mM to 35 mM, 15 mM to 40 mM, 15 mM to 45 mM, 15 mM to 50 mM, 15 mM to 55 mM, 15 mM to 60 mM, 20 mM to 25 mM, 20 mM to 30 mM, 20 mM to 35 mM, 20 mM to 40 mM, 20 mM to 45 mM, 20 mM to 50 mM, 20 mM to 55 mM, 20 mM to 60 mM, 30 mM to 35 mM, 30 mM to 40 mM, 30 mM to 45 mM, 30 mM to 50 mM, 30 mM to 55 mM, 30 mM to 60 mM, 35 mM to 40 mM, 35 mM to 45 mM, 35 mM to 50 mM, 35 mM to 55 mM, 35 mM to 60 mM, 40 mM to 45 mM, 40 mM to 50 mM, 40 mM to 55 mM, 40 mM to 60 mM, 45 mM to 50 mM, 45 mM to 55 mM, 45 mM to 60 mM, 50 mM to 55 mM, 50 mM to 60 mM, or 55 mM to 60 mM, and the like.

In a further embodiment of the present invention, when the at least one mineral salt of the thermal stable whey protein beverage is potassium chloride, the concentration of the potassium chloride can be up to 60 mM. In other embodiments, the concentration of the potassium chloride can be in a range from 10 mM to 60 mM. Thus, the concentration of potassium chloride used in the present invention can be 10 mM, 11 mM, 12 mM, 13 mM, 14 mM, 15 mM, 16 mM, 17 mM, 18 mM, 19 mM, 20 mM, 21 mM, 22 mM, 23 mM, 24 mM, 25 mM, 26 mM, 27 mM, 28 mM, 29 mM, 30 mM, 31 mM, 32 mM, 33 mM, 34 mM, 35 mM, 36 mM, 37 mM, 38 mM, 39 mM, 40 mM, 41 mM, 42 mM, 43 mM, 44 mM, 45 mM, 46 mM, 47 mM, 48 mM, 49 mM, 50 mM, 51 mM, 52 mM, 53 mM, 54 mM, 55 mM, 56 mM, 57 mM, 58 mM, 59 mM, or 60 mM, and the like.

In still further embodiments, the concentration of potassium chloride used in the present invention can be in a range from 10 mM to 15 mM, 10 mM to 20 mM, 10 mM to 25 mM, 10 mM to 30 mM, 10 mM to 35 mM, to 10 mM to 40 mM, 10 mM to 45 mM, to 10 mM to 50 mM, 10 mM to 55 mM, 15 mM to 20 mM, 15 mM to 25 mM, 15 mM to 30 mM, 15 mM to 35 mM, 15 mM to 40 mM, 15 mM to 45 mM, 15 mM to 50 mM, 15 mM to 55 mM, 15 mM to 60 mM, 20 mM to 25 mM, 20 mM to 30 mM, 20 mM to 35 mM, 20 mM to 40 mM, 20 mM to 45 mM, 20 mM to 50 mM, 20 mM to 55 mM, 20 mM to 60 mM, 30 mM to 35 mM, 30 mM to 40 mM, 30 mM to 45 mM, 30 mM to 50 mM, 30 mM to 55 mM, 30 mM to 60 mM, 35 mM to 40 mM, 35 mM to 45 mM, 35 mM to 50 mM, 35 mM to 55 mM, 35 mM to 60 mM, 40 mM to 45 mM, 40 mM to 50 mM, 40 mM to 55 mM, 40 mM to 60 mM, 45 mM to 50 mM, 45 mM to 55 mM, 45 mM to 60 mM, 50 mM to 55 mM, 50 mM to 60 mM, or 55 mM to 60 mM, and the like.

In other embodiments of the invention, the at least one mineral salt of the thermal stable whey protein beverage is a combination of sodium citrate and calcium chloride, wherein the concentration of sodium citrate and calcium chloride are each up to 20 mM. In further embodiments, the concentration of sodium citrate and calcium chloride are each in a range from 7 mM to 20 mM. Thus, in some embodiments of the present invention, the sodium citrate and calcium chloride can be each at a concentration of about 7 mM, about 8 mM, 9 mM, 10 mM, 11 mM, 12 mM, 13 mM, 14 mM, 15 mM, 16 mM, 17 mM, 18 mM, 19 mM, or 20 mM, and the like.

In a further aspect of the present invention, the concentration for sodium citrate and calcium chloride each can be in a range from 7 mM to 10 mM, 7 mM to 12 mM, 7 mM to 15 mM, 7 mM to 17 mM, 7 mM to 20 mM, 8 mM to 10 mM, 8 mM to 12 mM, 8 mM to 15 mM, 8 mM to 18 mM, 8 mM to 20 mM, 9 mM to 12 mM, 9 mM to 15 mM, 9 mM to 18 mM, 9 mM to 20 mM, 10 mM to 12 mM, 10 mM to 15 mM, 10 mm to 17 mM, 10 mM to 20 mM, 11 mM to 13 mM, 11 mM to 15 mM, 11 mM to 18 mM, 11 mM to 20 mM, 12 mM to 15 mM, 12 mM to 17 mM, 12 mM to 18 mM, 12 mM to 20 mM, 13 mM to 15 mM, 13 mM to 17 mM, 13 mM to 18 mM, 13 mM to 19 mM, 13 mM to 20 mM, 14 mM to 17 mM, 14 mM to 19 mM, 14 mM to 20 mM, 15 mM to 17 mM, 15 mM to 18 mM, 15 mM to 19 mM, 15 mM to 20 mM, 16 mM to 18 mM, 16 mM to 19 mM, 16 mM to 20 mM, 17 mM to 19 mM, 17 mM to 20 mM, or 18 mM to 20 mM, and the like.

The present invention further provides an aspect in which the at least one mineral salt of the thermal stable whey protein beverage is a combination of sodium citrate and calcium sulfate, wherein the concentration of sodium citrate and calcium sulfate are each up to 20 mM. In additional aspects of the present invention, the concentration of sodium citrate and calcium sulfate are each in a range from 7 mM to 20 mM. Thus, in some aspects of the present invention, the sodium citrate and calcium sulfate can be each at a concentration of 7 mM, 8 mM, 9 mM, 10 mM, 11 mM, 12 mM, 13 mM, 14 mM, 15 mM, 16 mM, 17 mM, 18 mM, 19 mM, or 20 mM, and the like.

In further aspects of the present invention, the concentration for sodium citrate and calcium sulfate in the thermal stable whey protein beverage each can be in a range from 7 mM to 10 mM, 7 mM to 12 mM, 7 mM to 15 mM, 7 mM to 17 mM, 7 mM to 20 mM, 8 mM to 10 mM, 8 mM to 12 mM, 8 mM to 15 mM, 8 mM to 18 mM, 8 mM to 20 mM, 9 mM to 12 mM, 9 mM to 15 mM, 9 mM to 18 mM, 9 mM to 20 mM, 10 mM to 12 mM, 10 mM to 15 mM, 10 mm to 17 mM, 10 mM to 20 mM, 11 mM to 13 mM, 11 mM to 15 mM, 11 mM to 18 mM, 11 mM to 20 mM, 12 mM to 15 mM, 12 mM to 17 mM, 12 mM to 18 mM, 12 mM to 20 mM, 13 mM to 15 mM, 13 mM to 17 mM, 13 mM to 18 mM, 13 mM to 19 mM, 13 mM to 20 mM, 14 mM to 17 mM, 14 mM to 19 mM, 14 mM to 20 mM, 15 mM to 17 mM, 15 mM to 18 mM, 15 mM to 19 mM, 15 mM to 20 mM, 16 mM to 18 mM, 16 mM to 19 mM, 16 mM to 20 mM, 17 mM to 19 mM, 17 mM to 20 mM, or 18 mM to 20 mM, and the like.

In some embodiments of the present invention, the thermal stable whey protein beverage further comprises at least one anionic polysaccharide at a concentration in a range from 0.01% weight percent (w/w) to 1.0% weight percent (w/w). Thus, in some embodiments of the present invention, the concentration of the at least one anionic polysaccharide in the thermal stable whey protein beverage can be 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, or 1.0% and the like. In other embodiments, the concentration of the at least one anionic polysaccharide in the thermal stable whey protein beverage can be in a range from 0.01% to 0.03%, from 0.01% to 0.05%, from 0.01% to 0.07%, from 0.01% to 0.09%, from 0.01% to 0.1%, from 0.01% to 0.2%, from 0.01% to 0.4%, from 0.01% to 0.6%, from 0.01% to 0.8%, from 0.01% to 1.0%, 0.02% to 0.05%, from 0.02% to 0.07%, from 0.02% to 0.09%, from 0.02% to 0.1%, from 0.02% to 0.2%, from 0.02% to 0.4%, from 0.02% to 0.6%, from 0.02% to 0.8%, from 0.02% to 1.0%, 0.03% to 0.05%, from 0.03% to 0.07%, from 0.03% to 0.09%, from 0.03% to 0.1%, from 0.03% to 0.2%, from 0.03% to 0.4%, from 0.03% to 0.6%, from 0.03% to 0.8%, from 0.03% to 0.9%, from 0.03% to 1.0%, from 0.04% to 0.07%, from 0.04% to 0.09%, from 0.04% to 0.1%, from 0.04% to 0.2%, from 0.04% to 0.4%, from 0.04% to 0.6%, from 0.04% to 0.8%, from 0.04% to 1.0%, from 0.05% to 0.07%, 0.05% to 0.09%, from 0.05% to 0.1%, from 0.05% to 0.2%, from 0.05% to 0.4%, from 0.05% to 0.6%, from 0.05% to 0.8%, from 0.05% to 1.0%, from 0.06% to 0.08%, 0.06% to 0.1%, from 0.06% to 0.2%, from 0.06% to 0.4%, from 0.06% to 0.6%, from 0.06% to 0.8%, from 0.06% to 1.0%, from 0.07% to 0.09%, from 0.07% to 0.1%, from 0.07% to 0.2%, from 0.07% to 0.4%, from 0.07% to 0.6%, from 0.07% to 0.8%, from 0.07% to 1.0%, from 0.08% to 0.1%, 0.08% to 0.2%, from 0.08% to 0.4%, from 0.08% to 0.6%, from 0.08% to 0.8%, from 0.08% to 1.0%, from 0.09% to 0.1%, from 0.09% to 0.2%, from 0.09% to 0.4%, from 0.09% to 0.6%, from 0.09% to 0.8%, from 0.09% to 1.0%, from 0.1% to 0.2%, from 0.1% to 0.4%, from 0.1% to 0.6%, from 0.1% to 0.8%, from 0.2% to 0.4%, from 0.2% to 0.6%, from 0.2% to 0.8%, from 0.2% to 1.0%, from 0.3% to 0.5%, from 0.3% to 0.7%, from 0.3% to 0.9%, from 0.3% to 1.0%, from 0.4% to 0.6%, from 0.4% to 0.8%, from 0.4% to 1.0%, from 0.5% to 0.7%, from 0.5% to 0.8%, from 0.5% to 1.0%, from 0.6% to 0.8%, from 0.6% to 1.0%, from 0.7% to 0.9%, from 0.7% to 1.0%, or from 0.8% to 1.0%, and the like.

The thermal stable whey protein beverage can further comprise at least one additional ingredient selected from the group consisting of vitamins, flavor additives, color additives, preservatives, thickeners or stabilizers and sweeteners, wherein the vitamins are at a concentration of 0.01% weight percent (w/w) to 10% weight percent (w/w), the flavor additives are at a concentration of 0.01% (w/w) to 10% (w/w), the color additives are at a concentration of 0.01% (w/w) to 10% (w/w), the preservatives are at a concentration of 0.01% (w/w) to 10% (w/w), thickeners or stabilizers are at a concentration of 0.01% (w/w) to 10% (w/w), and sweeteners are at a concentration of 0.01% (w/w) to 40% (w/w), and water to balance. Inclusion of one or more of these additives in the whey protein beverage of the present invention is optional.

Accordingly, the present invention discloses a process of making thermally stable whey proteins for high protein beverages containing mineral salts at a neutral pH, which can be used not only in making high-protein beverages containing mineral salts at a neutral pH, but also in other liquid and semi-solid applications which require heat stable whey proteins, including, but not limited to, soups, sauces, gravies and syrups.

The present invention is more particularly described in the Examples set forth below, which are not intended to be limiting of the embodiments of this invention.

EXAMPLES

Example 1

Figure 1:
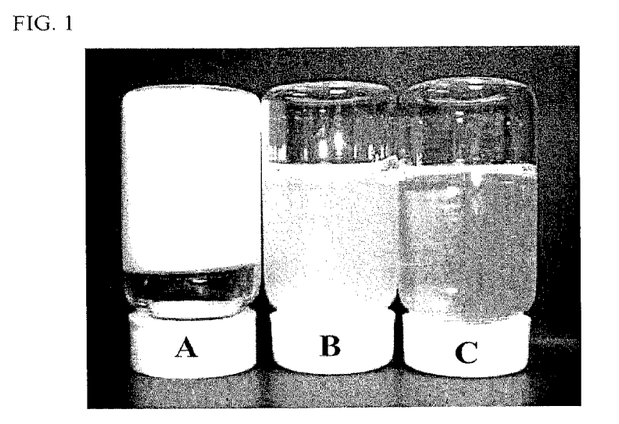
FIG. 1 shows the effect of two-step heating in preventing protein aggregation at neutral pH. A. A 3% β-lactoglobulin solution with calcium chloride heated in a conventional one-step heating process; B. A 6.5% β-lactoglobulin solution with calcium chloride and sodium citrate heated in a conventional one-step heating process; C. 6.5% β-lactoglobulin solution with calcium chloride and sodium citrate processed as described in the present invention.
Figure 2:
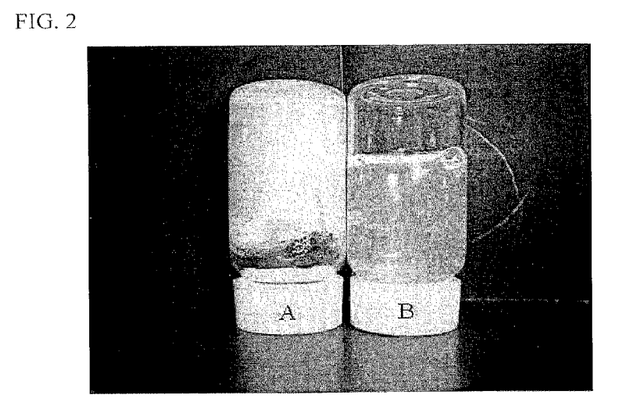
FIG. 2 compares heating of whey protein solution by conventional one step heating and by the process as described in the present invention.
Figure 3:
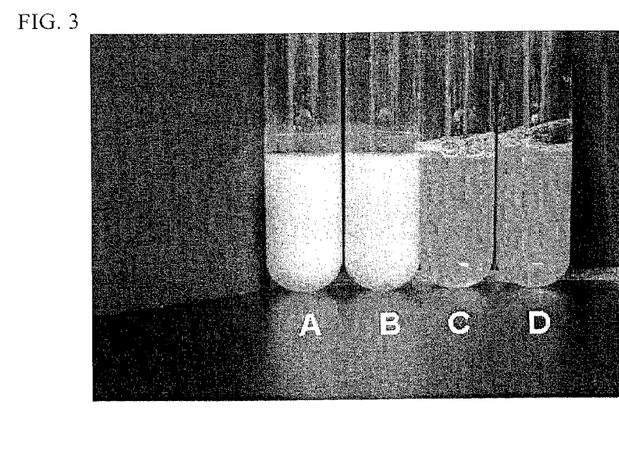
FIG. 3 compares heating of whey protein solution by conventional one step heating (FIGS. 3A and 3B) and by the process as described in the present invention (FIGS. 3C and 3D). Both methods are shown with (FIGS. 3B and 3D) and without (FIGS. 3A and 3C) the addition of anionic polysaccharide.

The advantage of the invention over traditional or conventional one-step heating process is shown in FIG. 1, FIG. 2 and FIG. 3. In FIG. 1A, 3% β-lactoglobulin (the major component of whey proteins), in the presence of 10 mM calcium chloride, was heated and cooled as is done in the traditional heating process. In this case, the protein solution turned into a white gel after heating. Calcium favors protein aggregation because it reduces the electrostatic interaction between proteins and acts as a bridge for proteins.

FIG. 1B represents 6.5% β-lactoglobulin in 10 mM calcium chloride and sodium citrate and the conventional one-step heating process conditions. The heated sample showed less aggregation as compared to the sample in FIG. 1A. Thus, using a chelator such as sodium citrate appeared to have some benefit in reducing opacity; however, the solution turned to a weak gel after storage.

In contrast, using the two-stage heating process of the present invention, 6.5% β-lactoglobulin with 10 mM calcium chloride and sodium citrate, less turbidity was observed and the solution remained soluble after storage as compared to the solution when processed using conventional methods (FIG. 1C). The pH of the samples in each case was close to 7.0.

Example 2

Another example is shown in FIG. 2. In this example, using conventional processing methods and thus, heating 5% β-lactoglobulin together with the 60 mM sodium chloride resulted in a very thick and turbid solution which turned into a gel after storage (FIG. 2A). In contrast, using the two-stage heating process of the present invention, the sample was less turbid and remained stable (FIG. 2B). The pH of the samples in each case was close to 7.0.

Example 3

A further example is shown in FIG. 3. Here, a 3% β-lactoglobulin solution with 40 mM sodium chloride at pH 6.2 is heated using conventional processing methods (one-step heating) for 15 min at 85° C. with (FIG. 3B) and without (FIG. 3A) the addition of anionic polysaccharide prior to the heating step. FIG. 3C shows a 6% β-lactoglobulin solution at pH 7.0 without any added anionic polysaccharide that was produced according to the methods of the present invention in which the solution was first heated for 10 min at 85° C. The β-lactoglobulin solution was then cooled and diluted with water to 3% after which 40 mM sodium chloride was added, pH 6.2, and again heated for 15 min at 85° C. Finally, FIG. 3D shows a 6% β-lactoglobulin solution with added anionic polysaccharide at pH 6.2 that was heated to 85° C. for 10 min. After cooling, the P-lactoglobulin solution was diluted to 3% with water, 40 mM sodium chloride was added and the solution heated once again at 85° C. for 15 mm.

Accordingly, in this example, using conventional processing methods and thus, heating in one step a 3% β-lactoglobulin solution together with 40 mM sodium chloride at a neutral pH of 6.2, with or without treatment with an anionic polysaccharide, resulted in a thick and turbid solution which turned into a gel after storage (FIGS. 3A and 3B). In contrast, using the two-stage heating process of the present invention at a neutral pH of 6.2, with and without an anionic polysaccharide, resulted in samples that were much less turbid and remained stable. Thus, the addition of an anionic polysaccharide to the aqueous solution of whey proteins having a neutral pH in a range of 6.0 to 6.5 during the first heating step (FIG. 3D) was found to reduce viscosity over the two-stage heating process of the present invention alone (FIG. 3C).

Shear viscosity of the samples was measured using rotational coaxial viscometry at 25 C with a Stress Tech controlled stress rheometer (ATS Rheosystems, Bordentown, N.J./Rheologica Instruments AB, Lund, Sweden). Samples were sheared at 50 s$^{-1}$ using a CC 25 Searle assembly with a 27.0 mm diameter cup and bob: 37.9 mm high, 25.0 mm diameter.

The optical density of the samples was measured at 600 nm using a Shimadzu UV-160U spectrophotometer (Shimadzu Corporation, Tokyo, Japan) at room temperature (22° C.±2° C.).

The above examples clearly illustrate the advantage of the invention.

Although the present invention has been described with reference to specific details of certain embodiments thereof, it is not intended that such details should be regarded as limitations upon the scope of the invention except as and to the extent that they are included in the accompanying claims.

Throughout this application, various patents, patent publications and non-patent publications are referenced. The disclosures of these patents, patent publications and non-patent publications in their entireties are incorporated by reference into this application in order to more fully describe the state of the art to which this invention pertains.

That which is claimed is:

1. A method for producing a thermal stable whey protein beverage comprising:
    (a) providing an aqueous solution of at least 2% whey proteins and having a neutral pH; then
    (b) heating said aqueous solution of whey proteins to a temperature of about 70° C. to about 150° C.; then
    (c) cooling said aqueous solution of whey proteins; then
    (d) adding at least one mineral salt at a concentration of about 7 mM to about 60 mM, wherein the mineral salt is sodium chloride or a combination of calcium chloride and sodium citrate; and then
    (e) heating said aqueous solution of whey protein to a temperature of about 70° C. to about 150° C. to produce a thermally stable whey protein beverage.

2. The method of claim 1, further comprising adding at least one anionic polysaccharide at step (a) or step (b).

3. The method of claim 2, wherein the at least one anionic polysaccharide is added at a concentration in a range from 0.01% to 1.0% and is selected from the group consisting of carrageenan, pectin and dextran sulfate.

4. The method of claim 1, further comprising adding at least one additional ingredient at step (d).

5. The method of claim 4, wherein the at least one additional ingredient is selected from the group consisting of vitamins, flavor additives, color additives, preservatives, thickeners or stabilizers and sweeteners.

6. The method of claim 1, wherein said at least one mineral salt is sodium chloride.

7. The method of claim 6, wherein the sodium chloride is added at a concentration of about 10 mM to about 60 mM.

8. The method of claim 1, wherein said at least one mineral salt is a combination of calcium chloride and sodium citrate.

9. The method of claim 8, wherein the calcium chloride and sodium citrate are each added at a concentration of about 7 mM to about 20 mM.

10. The method of claim 1, wherein said heating in step (b) or step (e) is for a time of 2 sec. to 30 min.

11. The method of claim 1, wherein said cooling is at a temperature in the range from 0° C. to 20° C. for a time of 1 min. to 30 min.

12. The method of claim 1, wherein water is added immediately after cooling in step (c).

13. A method for producing a thermal stable whey protein beverage under aseptic processing conditions, or pasteurizing or ultrapasteurizing conditions comprising:
 (a) providing an aqueous solution of at least 2% whey proteins and having a neutral pH; then
 (b) heating said aqueous solution of whey proteins to a temperature of about 70° C. to about 150° C.; then
 (c) cooling said aqueous solution of whey proteins; then
 (d) adding at least one mineral salt at a concentration of about 7 mM to about 60 mM, wherein the mineral salt is sodium chloride or a combination of calcium chloride and sodium citrate; and then
 (e) heating said aqueous solution of whey protein to a temperature of about 70° C. to 85° C. for about 10 sec to about 30 sec to produce a pasteurized thermal stable whey protein beverage, or to a temperature of about 135° C. to about 150° C. for at least about 2 sec to produce an ultrapasteurized thermal stable whey protein beverage or to a temperature of about 100° C. to about 150° C. for about 2 sec to about 30 sec to produce a thermally stable whey protein beverage for aseptic processing.

14. The method of claim 13, further comprising adding at least one anionic polysaccharide at step (a) or step (b).

15. The method of claim 14, wherein the at least one anionic polysaccharide is added at a concentration in a range from 0.01% to 1.0% and is selected from the group consisting of carrageenan, pectin and dextran sulfate.

16. The method of claim 13, further comprising adding under aseptic processing conditions, or pasteurizing or ultrapasteurizing conditions at least one additional ingredient at step (d).

17. The method of claim 16, wherein the at least one additional ingredient is selected from the group consisting of vitamins, flavor additives, color additives, preservatives, thickeners or stabilizers and sweeteners.

18. The method of claim 13, wherein said at least one mineral salt is sodium chloride.

19. The method of claim 18, wherein the sodium chloride is added at a concentration of about 10 mM to about 60 mM.

20. The method of claim 13, wherein said at least one mineral salt is a combination of calcium chloride and sodium citrate.

21. The method of claim 20, wherein the calcium chloride and sodium citrate are each added at a concentration of about 7 mM to about 20 mM.

22. The method of claim 13, wherein said heating in step (b) is for a time of 2 sec. to 30 min.

23. The method of claim 13, wherein said cooling is at a temperature in the range from 0° C. to 20° C. for a time of 1 min. to 30 min.

24. The method of claim 13, wherein water is added under aseptic processing conditions, or pasteurizing or ultrapasteurizing conditions immediately after cooling in step (c).

* * * * *

UNITED STATES PATENT AND TRADEMARK OFFICE
CERTIFICATE OF CORRECTION

PATENT NO.        : 8,227,009 B2
APPLICATION NO.   : 12/212995
DATED             : July 24, 2012
INVENTOR(S)       : Foegeding et al.

It is certified that error appears in the above-identified patent and that said Letters Patent is hereby corrected as shown below:

Column 3, Line 53:    correct "+0.5%,"
                      to read -- ±0.5%, --

Column 22, Line 3:    correct "the P-lactoglobulin"
                      to read -- the β-lactoglobulin --

Column 22, Line 5:    correct "for 15 mm."
                      to read -- for 15 min. --

Signed and Sealed this
Eighteenth Day of December, 2012

David J. Kappos
*Director of the United States Patent and Trademark Office*